United States Patent
Srinivasan et al.

(10) Patent No.: US 8,145,843 B2
(45) Date of Patent: *Mar. 27, 2012

(54) DEDUPLICATION OF DATA ON DISK DEVICES USING LOW-LATENCY RANDOM READ MEMORY

(75) Inventors: Kiran Srinivasan, Cupertino, CA (US); Garth Goodson, Fremont, CA (US); Kaladhar Voruganti, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,337

(22) Filed: Feb. 7, 2011

(65) Prior Publication Data

US 2011/0131390 A1 Jun. 2, 2011

Related U.S. Application Data

(63) Continuation of application No. 12/110,193, filed on Apr. 25, 2008, now Pat. No. 7,908,436.

(51) Int. Cl.
*G06F 12/02* (2006.01)
(52) U.S. Cl. .................... 711/114; 711/112; 711/103
(58) Field of Classification Search .................. None
See application file for complete search history.

(56) References Cited

U.S. PATENT DOCUMENTS

| | | | |
|---|---|---|---|
| 7,908,436 B1 * | 3/2011 | Srinivasan et al. | 711/114 |
| 2005/0154848 A1 * | 7/2005 | Itoh et al. | 711/162 |
| 2009/0132619 A1 * | 5/2009 | Arakawa et al. | 707/205 |
| 2009/0204649 A1 * | 8/2009 | Wong et al. | 707/204 |

OTHER PUBLICATIONS

U.S. Appl. No. 12/110,193, filed Apr. 25, 2008, Srinivasan, et al.

* cited by examiner

*Primary Examiner* — Than Nguyen
(74) *Attorney, Agent, or Firm* — Stattler-Suh PC

(57) ABSTRACT

Deduplication of data using a low-latency random read memory (LLRRM) is described herein. Upon receiving a block, if a matching block stored on a disk device is found, the received block is deduplicated by producing an index to the address location of the matching block. In some embodiments, a matching block having a predetermined threshold number of associated indexes that reference the matching block is transferred to LLRRM, the threshold number being one or greater. Associated indexes may be modified to reflect the new address location in LLRRM. Deduplication may be performed using a mapping mechanism containing mappings of deduplicated blocks to matching blocks, the mappings being used for performing read requests. Deduplication described herein may reduce read latency as LLRRM has relatively low latency in performing random read requests relative to disk devices.

20 Claims, 15 Drawing Sheets

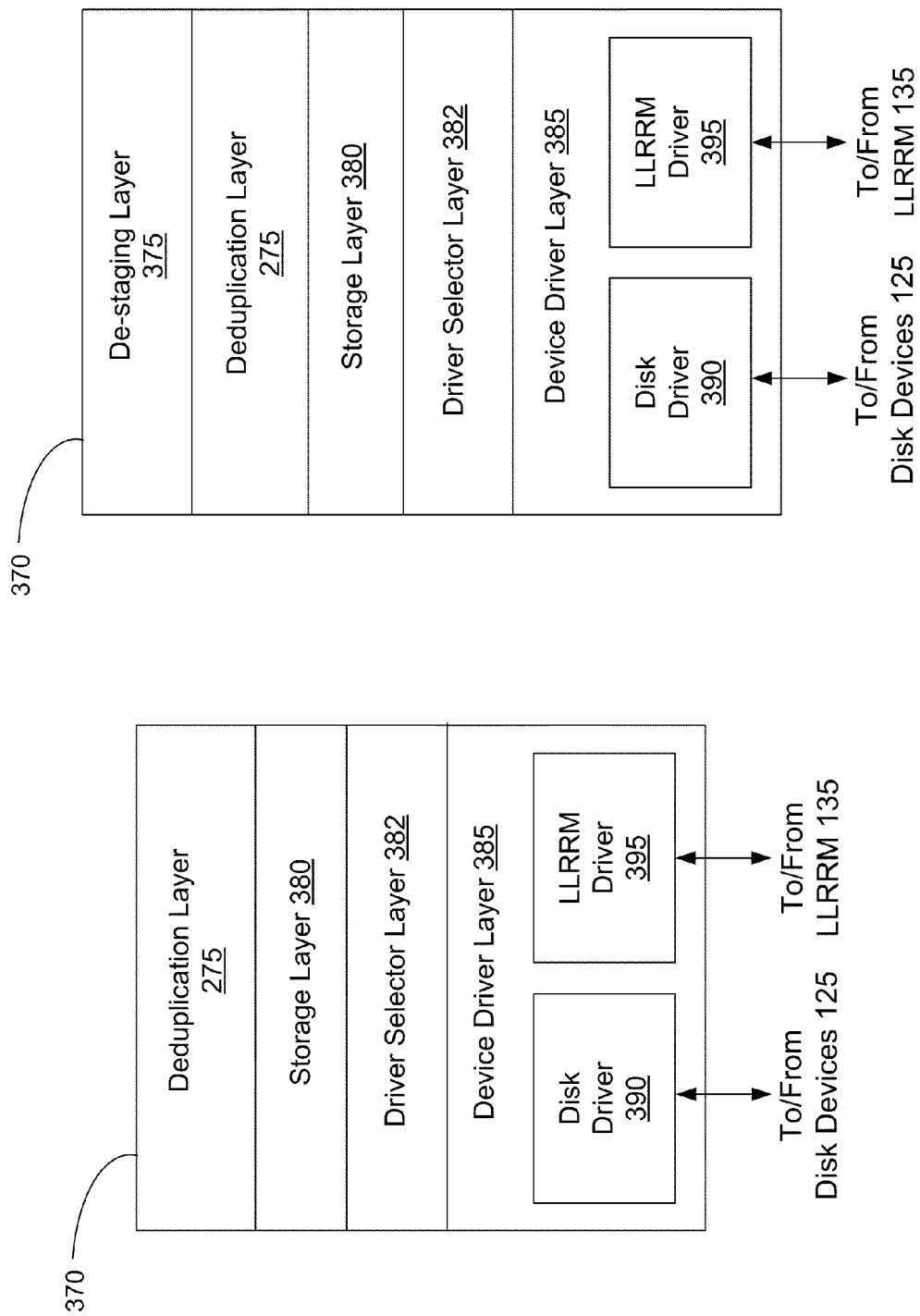

| Content ID | Location on disk | Location on LLRRM | Ref Count | Pointers |
|---|---|---|---|---|
| C1 | LBN D1 | LBN F1 | 3 | P1, P2, P3 |
| C2 | LBN D2 | | 0 | |
| C3 | LBN D3 | LBN F2 | 2 | P4, P5 |
| C4 | LBN D4 | | 1 | P6 |
| C5 | LBN D5 | | 0 | |
| C6 | LBN D6 | LBN F3 | 2 | P7, P8 |
| ... | ... | ... | ... | ... |

Fig. 11

| Deduplicated Block Location | Matching Stored Block Location |
|---|---|
| LBN B1 | LBN 6 |
| LBN B2 | LBN 7 |
| LBN B3 | LBN FY |
| LBN B4 | LBN DY |
| ... | ... |

Fig. 12

DEDUPLICATION OF DATA ON DISK DEVICES USING LOW-LATENCY RANDOM READ MEMORY

RELATED APPLICATIONS

This patent application claims benefit to and is a continuation of the U.S. patent application entitled "DEDUPLICATION OF DATA ON DISK DEVICES USING LOW-LATENCY RANDOM READ MEMORY," having Ser. No. 12/110,193, filed on Apr. 25, 2008 now U.S. Pat. No. 7,908,436, which is incorporated herein by reference. This application is related to U.S. patent application Ser. No. 12/110,122, entitled "Deduplication of Data on Disk Devices Based on a Threshold Number of Sequential Blocks," by Kiran Srinivasan, et al., filed on Apr. 25, 2008, which is incorporated herein by reference.

FIELD OF THE INVENTION

The present invention relates to storage systems, and particularly, to deduplication of data on disk devices using low-latency random read memory.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from Network Appliance, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

The storage system may implement deduplication methods when storing data on the storage devices. Deduplication methods may be used to remove redundant data and to ensure that only a single instance of the same data is stored on the storage devices. Rather than storing multiple copies of the same data on the storage devices, a single instance of the data is typically stored and referenced/indexed multiple times. Since redundant data is removed, deduplication of data typically saves storage space.

Deduplication of data, however, may also cause longer read latencies when reading data that has been deduplicated (e.g., as compared to performing sequential read accesses on a file that has not been deduplicated). For example, when a file to be written to the storage devices is received, any blocks of the received file that match any blocks currently stored in the storage devices are typically considered redundant blocks and are deduplicated (i.e., are deleted from or not stored to the storage devices and a reference/index to the address location of the matching stored blocks is produced in their place). Any non-redundant blocks in the received file are written to the storage devices. When a read request for the received file is later received, the storage system performs the read request by retrieving the stored non-redundant blocks and, for each redundant block, uses the reference/index produced for the redundant block to seek and retrieve its matching stored block.

However, when the storage devices comprise disk devices, the matching stored blocks may be written on particular tracks of a platter of the disk device, whereas the non-redundant blocks of the received file are typically written on different tracks of the disk device. When reading blocks from the same track, a read/write head of the disk device typically exhibits low latency times as it may quickly retrieve the blocks sequentially from the same track. When reading blocks from different tracks, however, a read/write head of the disk device incurs significant seek times each time it repositions onto a different track to retrieve a block of data.

Since deduplication of data is typically performed on a single-block basis (whereby each individual block found to be redundant is deduplicated), later reading of the received file may incur significant read latency if the read/write head frequently seeks and retrieves single blocks stored on different tracks. For example, later reading of the received file may comprise retrieving non-redundant blocks on a first track, seeking and retrieving a single matching stored block on a second track, then seeking and retrieving non-redundant blocks on the first track, then seeking and retrieving a single matching stored block on the second track, etc.

As such, conventional use of deduplication on a single-block basis on a disk device may later cause significant read latency as the read/write head of the disk device repositions back and forth between different tracks to seek and retrieve single matching blocks. As such, there is a need for a method and apparatus for utilizing deduplication of data on disk devices that mitigates the later read latency of the data.

SUMMARY OF THE INVENTION

A method and apparatus for deduplication of data using low-latency random read memory (referred to herein as "LLRRM") is described herein. In some embodiments, an LLRRM (e.g., flash memory, etc.) comprises a device having lower latency in performing random read requests relative to disk devices. In these embodiments, deduplication may be performed by receiving a series of one or more blocks and, for each received block, determining whether the received block matches (in data content) a block stored on a storage device. If a matching stored block is found to exist for a received block, the received block may be deduplicated using the matching stored block, whereby the matching stored block is transferred from the storage device to an LLRRM. In some embodiments, the storage device comprises a disk device. As such, deduplication using LLRRM may reduce the later read latency of a file or set of blocks.

If a matching block is not found to exist, a received block is not deduplicated and is stored to a storage device. If a matching stored block is found to exist, a received block is considered redundant and is deduplicated. Deduplication of the received block may be performed by deleting from or not storing the received block to a storage device and producing an index to the address location of the matching stored block. In some embodiments, a number of indexes ("associated indexes") referencing the matching stored block is also checked to determine whether to transfer the matching stored block to LLRRM. The number of associated indexes may indicate the number of redundant blocks ("associated deduplicated blocks") that are deduplicated using the matching stored block. In some embodiments, a reference count represents the number of associated indexes or associated deduplicated blocks.

In some embodiments, a matching stored block having one associated index (or associated deduplicated block) is transferred to LLRRM for storage. In some embodiments, a matching stored block having a predetermined threshold number (THN) of associated indexes (or associated deduplicated blocks) is transferred to LLRRM for storage, the threshold number being one or greater. When transferred to LLRRM from a storage device, the matching stored block is assigned a new address location in LLRRM. Any associated indexes for any associated deduplicated blocks may be modified to reflect the new address location of the matching stored block in LLRRM. As such, deduplication of the received redundant block may be performed by producing an index to the new address location of the matching stored block in LLRRM.

In some embodiments, deduplication is performed using a block-comparison mechanism and a mapping mechanism. It is determined if a received block matches a stored block by querying the block-comparison mechanism. The block-comparison mechanism may comprise metadata entries of currently stored blocks. The received blocks may also be processed to create new metadata entries in the block-comparison mechanism. Based on the results of the query to the block-comparison mechanism, a received block may be deduplicated. If so, an index to the matching stored block is produced in the mapping mechanism which is used to record mappings of deduplicated redundant blocks to their corresponding matching stored blocks (whether stored in LLRRM or on a storage device). The mapping mechanism may be used to perform later read requests received for deduplicated blocks.

In some embodiments, deduplication methods are used that leverage the particular characteristics and advantages of LLRRM over disk devices. In some embodiments, an LLRRM comprises a device having lower latency in performing random read requests relative to disk devices. In some embodiments, LLRRM may comprise non-volatile, rewritable computer memory having relatively low latency in performing random read requests compared with disk devices. Examples of LLRRM devices include flash memory, Magnetic Random Access Memory (MRAM), Phase Change RAM (PRAM), or the like. In some embodiments, LLRRM does not comprise a set of tracks for storing data blocks (as do disk devices). Thus, seek operations to read blocks stored on different tracks are not needed when performing read operations on LLRRM (and thereby seek latencies are not incurred in LLRRM). As such, when matching blocks are later read from LLRRM, read latency may be mitigated.

The deduplication methods using LLRRM described herein may be used in conjunction with other deduplication methods for disk devices (such as a deduplication method that provides efficient sequential accesses to disk devices). In some embodiments, the deduplication methods using LLRRM described herein are used in combination with a deduplication method for disk devices based on a threshold number (THN) of sequential blocks, which is described in U.S. patent application Ser. No. 12/110,122, entitled "Deduplication of Data on Disk Devices Based on a Threshold Number of Sequential Blocks," by Kiran Srinivasan, et al., filed herewith, and incorporated herein by reference. In these embodiments, matching blocks (used for deduplicating received blocks) that occur in a sequence are may be stored on a disk device while also reducing read latency. For matching blocks that may not be efficiently stored on disk devices, the matching blocks may be stored to LLRRM.

BRIEF DESCRIPTION OF THE DRAWINGS

The novel features are set forth in the appended claims. However, for purpose of explanation, several embodiments of the invention are set forth in the following figures.

FIG. 4 is a conceptual diagram of storage-side layers of the storage operating system;

FIG. 5 is a conceptual diagram of storage-side layers of the storage operating system comprising a de-staging layer;

FIG. 11 shows a conceptual diagram of an exemplary block-comparison mechanism comprising a metadata structure;

FIG. 12 shows a conceptual diagram of an exemplary mapping mechanism comprising a metadata structure;

DETAILED DESCRIPTION

The disclosure of U.S. patent application entitled "DEDUPLICATION OF DATA ON DISK DEVICES USING LOW-LATENCY RANDOM READ MEMORY," having Ser. No. 12/110,193, filed on Apr. 25, 2008, is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into six sections. Section I describes a storage system environment in which some embodiments operate. Section II describes deduplication of data on disk devices. Section III describes deduplication of data using LLRRM. Section IV describes block-comparison and mapping mechanisms used for deduplication of data using LLRRM. Section V describes methods for implementing deduplication of data using LLRRM. Section VI describes using the deduplication methods for using LLRRM described herein in combination with a deduplication method for disk devices based on a threshold number (THN) of sequential blocks.

I. Storage System Environment

Figure 1:
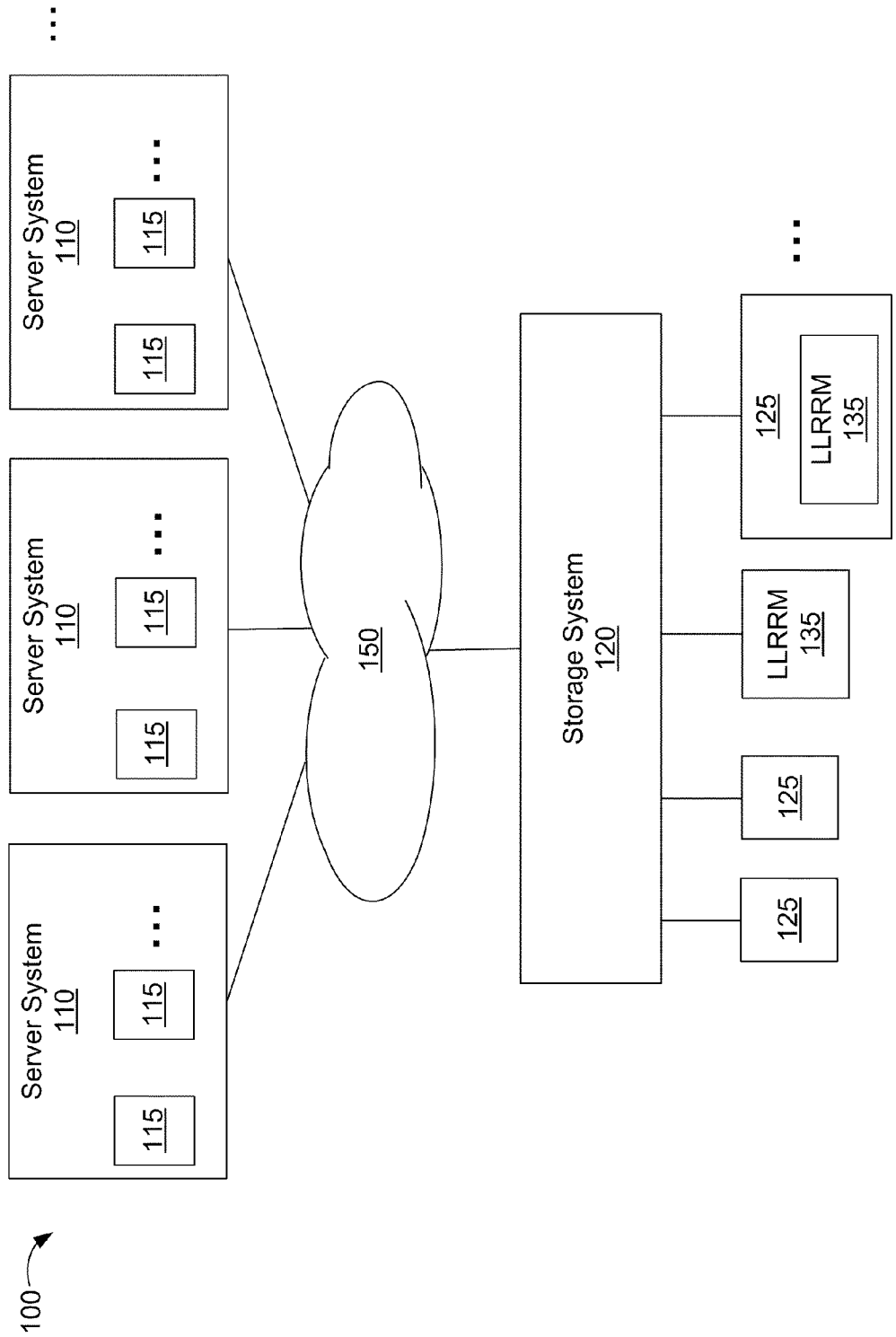
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 (comprising a set of one or more storage devices 125 and a set of one or more low-latency random read memory (LLRRM) devices 135) that are connected via a connection system 150. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices 125 of the storage system 120. A server system 110 may execute one or more applications 115 that submit read/write requests for reading/writing data on the storage devices 125 of the storage system 120. In some embodiments, the storage system 120 may receive read/write requests from two or more applications 115 (executing on one or more server systems 110) simultaneously. The two or more applications 115 may be accessing different sets of storage devices 125 or volumes of the storage system 120.

Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, and any other similar media adapted to store information (including data and parity information). In some embodiments, a storage device 125 comprises a disk device (described in detail below). In other embodiments, the storage device 125 may comprise any other type of storage device. In some embodiments, the storage system 120 also stores data in a set of one or more LLRRM devices 135.

The storage system 120 may implement a file system to logically organize the data as a hierarchical structure of directories and files on the storage devices 125 and LLRRM devices 135. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

In some embodiments, a file system specific for LLRRM is implemented on an LLRRM 135, such as Journalling Flash File System (JFFS), JFFS2, Yet Another Flash File System (YAFFS), etc. As known in the art, the LLRRM 135 may implement a sub-system for performing various input/output operations (such as transferring/storing data onto the LLRRM 135 and for later accessing data on the LLRRM 135). The sub-system may comprise a device driver, file system, and other software layers for performing the various input/output operations.

The LLRRM device 135 may comprise a separate (standalone) LLRRM 135 or may be integrated as part of a storage device 125 (such as a hybrid drive comprising an LLRRM and a magnetic storage combined in a single device). As discussed below in relation to FIG. 2, an LLRRM device may also reside in the storage system's internal architecture and be connected with the system bus (e.g., as an LLRRM module on a card). Some embodiments herein may utilize the LLRRM in a similar manner, regardless of the configuration or location of the LLRRM, so that the LLRRM and storage device(s) 125 operate together in a way that is transparent to applications accessing data stored on the storage system 120.

In some embodiments, an LLRRM device 135 may comprise rewritable computer memory having relatively low latency in performing random read requests compared with disk devices. Examples of LLRRM devices include flash memory, Magnetic Random Access Memory (MRAM), Phase Change RAM (PRAM), or the like. The LLRRM device 135 may comprise a non-volatile, rewritable computer memory (i.e., a computer memory that does not require power to maintain information stored in the computer memory and may be electrically erased and reprogrammed). In some embodiments, the non-volatile characteristic of LLRRM is utilized by transferring matching blocks stored on a disk device 125 to an LLRRM device 135 for storage. In these embodiments, after being transferred from the storage device 125 and stored to the LLRRM, a matching stored block may optionally be deleted from the storage device 125 on which it was originally stored. In further embodiments, any subsequent read requests of transferred matching stored blocks are performed by retrieving the matching stored blocks from LLRRM rather than a disk device.

In some embodiments, LLRRM does not comprise a set of tracks for storing data blocks (as do disk devices). Thus, seek operations and time penalties for random reading of blocks stored on different tracks are not incurred when performing read operations on LLRRM. In some embodiments, this characteristic of LLRRM is utilized by storing matching blocks on an LLRRM device 135 (rather than a disk device) for performing later read operations on the matching blocks, thus mitigating read latency.

Figure 2:
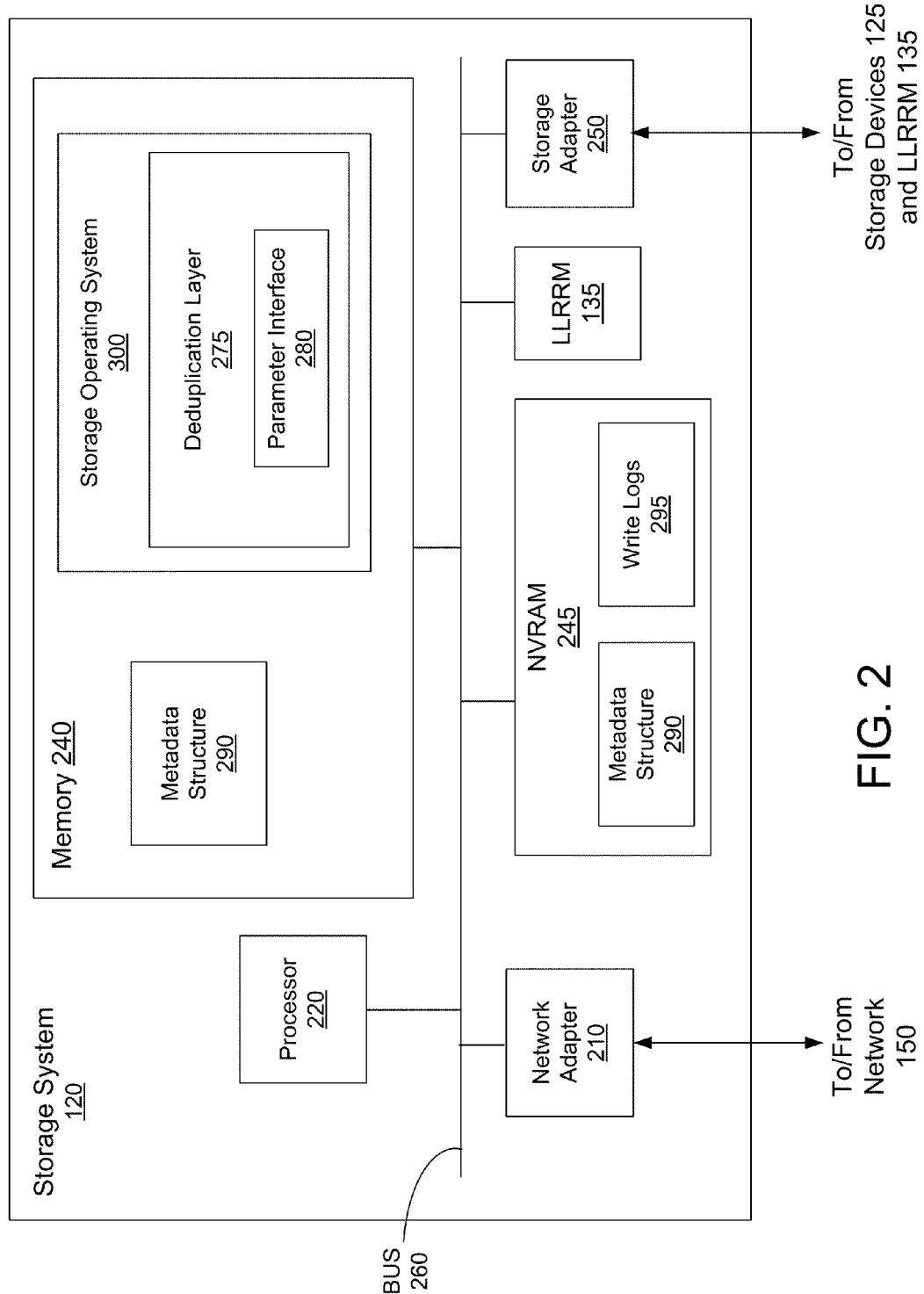
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. In some embodiments, the storage system 120 further comprises an LLRRM device 135 that resides in the storage system's internal architecture and is connected with the system bus 260. For example, the LLRRM device 135 may be an LLRRM module on a Peripheral Component Interconnect (PCI) or PCI eXtended (PCI-X) card that is connected with the system bus 260.

The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. an LLRRM), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a deduplication layer 275) that are executed by the processor 220. In some embodiments, the deduplication layer 275 is implemented to deduplicate data using LLRRM 135. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a metadata structure 290 is also resident in memory 240. In other embodiments, the metadata structure 290 may also be resident in NVRAM 245, or stored on a storage device 125. As discussed below, in some embodiments, the metadata structure 290 is produced and used by the deduplication layer 275 to store metadata for stored blocks and is used to determine whether received blocks match any stored blocks. In these embodiments, the metadata structure 290 is sometimes referred to as a block-comparison mechanism. In other embodiments, the metadata structure 290 is also used by the deduplication layer 275 to record mappings of deduplicated redundant blocks to their corresponding matching stored blocks. In these embodiments, the metadata structure 290 is sometimes also referred to as a mapping mechanism.

In some embodiments, the metadata structure 290 may be stored on LLRRM 135. The deduplication layer 275 accesses various data in the metadata structure 290 which may be stored in various locations in the metadata structure 290. As such, random reads of data on the metadata structure 290 may be used by the deduplication layer 275. Since LLRRM provides persistent non-volatile storage as well as low latency for random reads, the metadata structure 290 may be stored on LLRRM 135 in some embodiments.

The storage adapter 250 cooperates with the storage operating system 300 executing on the storage system 120 to access data requested by the server system 110. The data may be stored on the storage devices 125 and LLRRM devices 135 that are attached, via the storage adapter 250, to the storage system 120 or other node of a storage system as defined herein. The storage adapter 250 includes input/output (I/O) interface circuitry that couples to the storage devices 125 and LLRRM devices 135 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
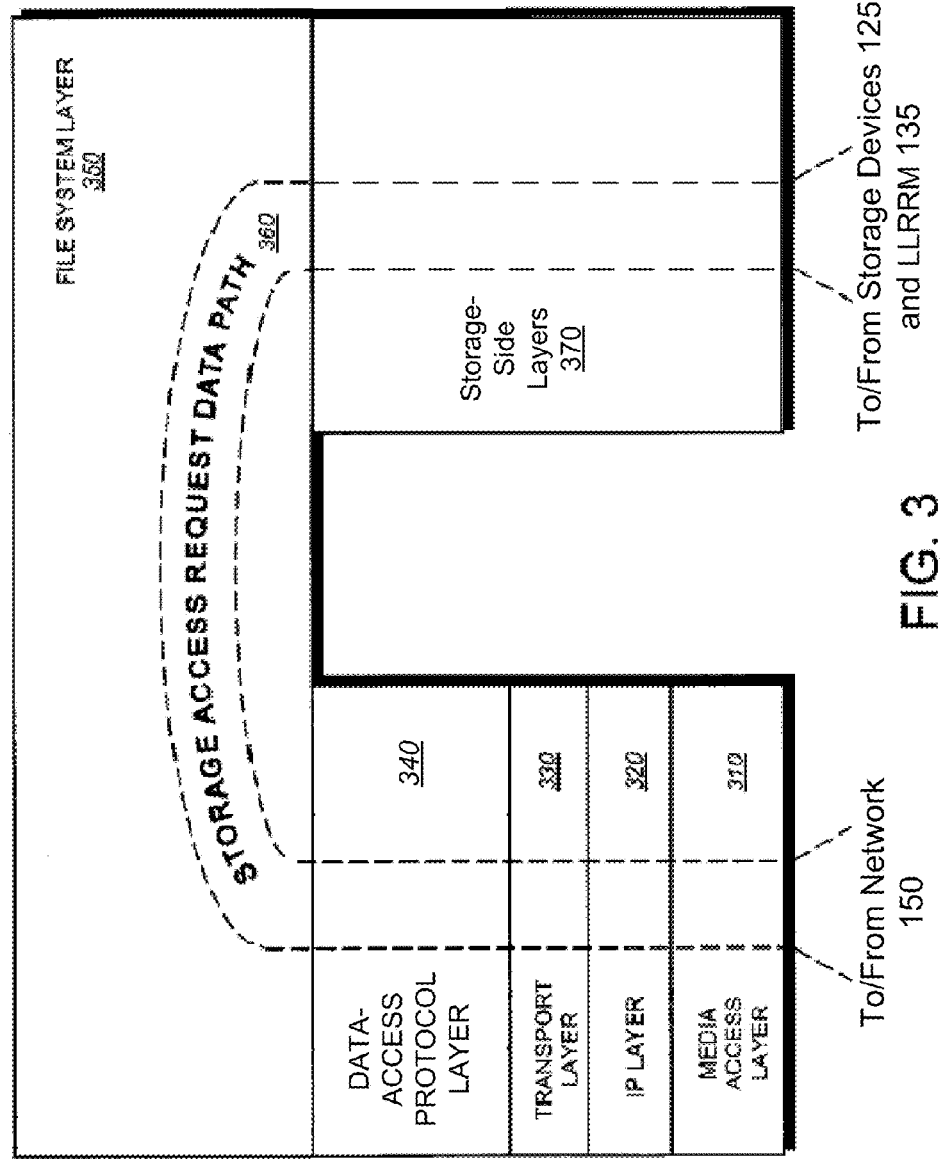
FIG. 3 is a schematic block diagram of an exemplary storage operating system that may be implemented by the storage system in FIG. 2.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 and LLRRM 135 using storage-side layers 370. As shown in FIG. 4, the storage-side layers 370 may include a storage layer 380 (that implements a storage protocol, such as a RAID protocol), driver selector layer 382, and a device driver layer 385 (comprising a disk driver 390 and an LLRRM driver 395). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 may determine an address space for the set of storage devices 125 and set of LLRRM devices 135 of the storage system 120. The address space may comprise a total range of address locations for storing data blocks in the set of storage devices 125 and the set of LLRRM devices 135, wherein each data block in a storage device 125 or an LLRRM device 135 is assigned a unique address location within the address space. In some embodiments, the file system layer 350 may further determine, within the total range of address locations, a disk sub-range of address locations for storing data blocks in the set of storage devices 125 and a memory sub-range of address locations for storing data blocks in the set of LLRRM devices 135.

For example, the address space may comprise a total range of logical block numbers (LBNs) 0 through N for storing data blocks in the set of storage devices 125 and the set of LLRRM devices 135, wherein each data block in a storage device 125 or an LLRRM device 135 is assigned a unique LBN. The file system layer 350 may further determine within the total range of LBNs (0 through N), a disk sub-range of LBNs (0 through M) for storing data blocks in a set of disk devices 125 and a memory sub-range of LBNs (M+1 through N) for storing data blocks in the set of LLRRM devices 135. As used herein, "LBN Dn" may indicate an LBN value within the disk sub-range of LBNs and "LBN Fn" may indicate an LBN value within the memory sub-range of LBNs. As such, for example, a block having LBN D1 indicates the block is stored on the set of disk devices 125 and a block having LBN F1 indicates the block is stored on the set of LLRRM devices 135.

The file system layer 350 also assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain information regarding the block locations of the file. In some embodiments, the block locations are indicated by LBNs assigned for each block of the file. The file system 350 may store and maintain an inode file that contains and indexes (by inode number) the inodes of the various files.

In response to receiving a file-access request (containing an external file handle) from a server system 110, the file system 350 generates operations to perform the request (such as storing data to or loading/retrieving data from the storage devices 125 or LLRRM 135). The external file handle in the access request typically identifies a file or directory requested by the server system 110. Specifically, the file handle may specify a generation number, inode number and volume number corresponding to the accessed data. If the information is not resident in the storage system's memory 240, the file system layer 350 indexes into the inode file using the received inode number to access the appropriate inode entry for the identified file and retrieve file location information (e.g., LBN) from the inode. The file system layer 350 then passes the access request and requested LBN to the appropriate driver (for example, an encapsulation of SCSI implemented on a fibre channel interconnection) of the device driver layer 385. In these embodiments, the device driver layer 385 that implements a device control protocol (such as small computer system interface (SCSI), integrated drive electronics (IDE), etc.).

In some embodiments, the file system layer 350 passes the access request and specified LBN to the driver selector layer 382 which then passes the request and the LBN to the disk driver 390 or the LLRRM driver 395 of the device driver layer 385. In these embodiments, based on the value of the received address location (e.g., LBN), the driver selector layer 382 determines which driver in the device driver layer 385 to send the received access request and address location for processing. In these embodiments, the driver selector layer 382 sends received requests having address locations within the disk sub-range of address locations (e.g., LBNs) to the disk device driver 390 and sends received requests having address locations within the memory sub-range of address locations (e.g., LBNs) to the LLRRM driver 395 for processing. As such, the driver selector layer 382 may be used to perform write or read requests on the set of storage devices 125 or the set of LLRRM 135 as needed by some embodiments described herein.

Using the received LBNs, the device driver layer 385 accesses the appropriate blocks from the storage devices 125 or the LLRRM devices 135 and loads requested data in memory 240 for processing by the storage system 120. In some embodiments, if the LBN is within the disk sub-range of LBNs, the disk driver 390 accesses the appropriate blocks from the storage devices 125. If the LBN is within the memory sub-range of LBNs, the LLRRM driver 395 accesses the appropriate blocks from the LLRRM devices 135. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and file system of the storage operating system 300 to deduplicate data stored on the storage system 120 as described herein. For example, in some embodiments, the deduplication layer 275 may reside between the file system layer 350 and the storage layer 380 of the storage operating system 300 (as shown in FIGS. 3 and 4). In other embodiments, the deduplication layer 275 may reside near other layers of the storage operating system 300.

In some embodiments, the storage-side layers 370 also include a de-staging layer 375 (as shown in FIG. 5). For example, in some embodiments, the de-staging layer 375 may reside between the file system layer 350 and the deduplication layer 275 of the storage operating system 300 (as shown in FIGS. 3 and 5). In other embodiments, the de-staging layer 375 may reside near other layers of the storage operating system 300. The de-staging layer 375 may be implemented in some storage systems 125 to perform received write requests for files in two stages. In a first stage, write requests received by the file system layer 350 are sent to the de-staging layer 375, a write request containing blocks of data to be written. The de-staging layer 375 produces a write log for each received write request, a write log containing the blocks of data to be written. The write logs 295 may be stored, for example, to the NVRAM 245 (as shown in FIG. 2). In a second stage, at predetermined time intervals (referred to as consistency points), accumulated write logs 295 (e.g., in the NVRAM 245) are sent to the storage layer 380 which then writes the blocks of data in the write logs to a storage device 125.

Embodiments described herein may be applied to a storage system 120 that is implemented with or without a de-staging layer 375. In some embodiments, the deduplication layer 275 is used in conjunction with the de-staging layer 375. In these embodiments, the deduplication layer 275 may process the write logs accumulated during the first stage that are awaiting the next consistency point to be written to a storage device 125. During this time, the deduplication layer 275 may process the blocks in the accumulated write logs for possible deduplication before the blocks are written to the storage devices 125. In other embodiments, the deduplication layer 275 is used without use of a de-staging layer 375. In these embodiments, the deduplication layer 275 may receive write requests from the file system 350 and process blocks of the write requests for deduplication as they are received.

Note that when a write log for a write request for a file is produced in the first stage, the file system layer 350 may assign LBNs for each block in the file to be written, the assigned LBN of a block indicating the location on a storage device 125 where the block will be written to at the next consistency point. Also, the file system layer 350 may assign an inode number and an inode for the file. As such, each write log may comprise blocks of data to be written, the locations (LBNs) of where the blocks are to be written, and an inode number assigned to the file. When a write log for a write request for a file is produced in the first stage, the file system layer 350 may also store LBNs for the blocks of the file in its assigned inode.

In other embodiments where the deduplication layer 275 is used without the de-staging layer 375, the deduplication layer 275 may receive write requests for files from the file system 350, whereby the file system layer 350 may assign LBNs for each block in the file to be written. Also, the file system layer 350 may assign an inode number and an inode for the file and store the assigned LBN for the blocks of the file in its assigned inode.

In some embodiments, the deduplication layer 275 may be pre-included in storage operating system 300 software. In other embodiments, the deduplication layer 275 may comprise an external auxiliary plug-in type software module that works with the storage operating system 300 to enhance its functions. As such, the deduplication layer 275 may be imposed upon an existing storage operating system 300 and file system 350 to provide deduplication of data as described herein. In further embodiments, the deduplication layer 275 may comprise an external auxiliary plug-in type software module that works with pre-existing deduplication software to enhance functions of the deduplication software as described herein.

II. Deduplication of Data on Disk Devices

The storage system 120 may implement deduplication methods when storing data on the storage devices 125. Deduplication methods may be used to remove redundant data and ensure that only a single instance of the same data is stored on the storage devices. Rather than storing multiple copies of the same data on the storage devices, a single instance of the data is typically stored and referenced/indexed multiple times. Deduplication of data may be applied at any level, for example, across a single storage device 125 or volume (where redundant data within the single storage device 125 or volume are removed), across multiple storage devices 125 or volumes (where redundant data within multiple storage devices 125 or volumes are removed), across the entire storage system 120

(where redundant data within the storage system 120 are removed), across multiple storage systems 120 (where redundant data within the multiple storage systems 120 are removed), and so forth. Since redundant data is removed, deduplication of data typically saves storage space. Deduplication of data, however, may also cause longer read latencies when reading data that has been deduplicated on a disk device.

Figure 6:
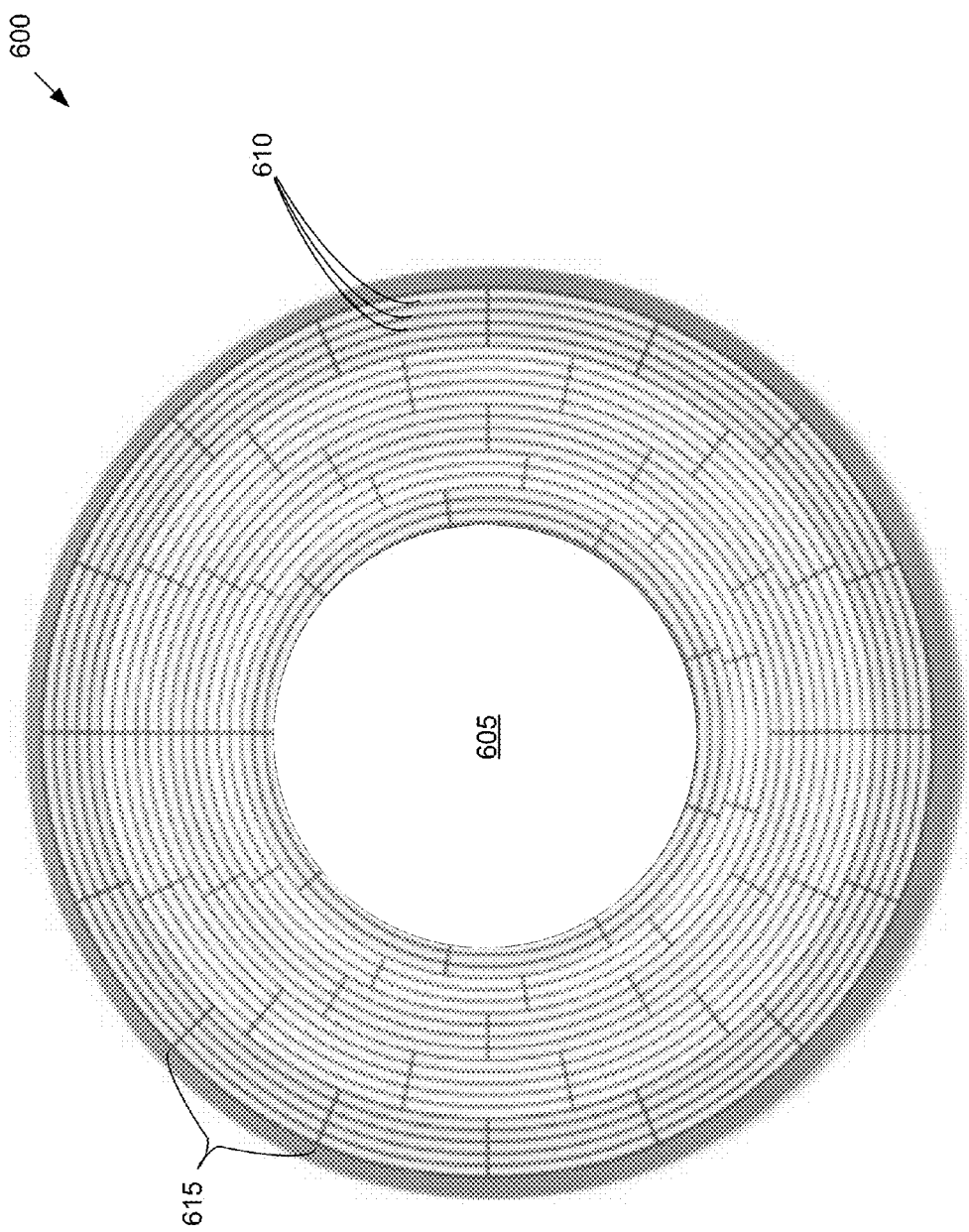
FIG. 6 is a conceptual representation of a disk platter of a disk device.

As known in the art, a disk device comprises a plurality of stacked platters, each platter having a read/write head that retrieves and writes data to the platter. FIG. 6 shows a conceptual representation of a disk platter 605 that comprises a plurality of tracks 610 (shown as concentric circles), each track being divided into a plurality of sectors/blocks 615 (shown as segments of the concentric circles). As used herein, a "block" may comprise any size of data (e.g., 1 byte, 4 KB, 8 KB, etc.). Each block that is stored in the storage system 120 is typically assigned a unique logical block number (LBN) by the file system 350. In the embodiments described below, the locations of blocks are indicated by LBNs. However, in other embodiments, the storage locations of blocks are indicated by another type of number (other than LBN).

As used herein, blocks 615 on a disk platter 605 are accessed "sequentially" when they are accessed from the same track 610 in order (i.e., accessed one after another along the same track). When reading blocks sequentially from the same track, the read/write head of the disk device typically exhibits low latency times. As used herein, blocks 615 on a disk platter 605 are accessed "randomly" when they are accessed from different tracks 610. When reading blocks from different tracks, the read/write head of the disk device may incur significant latency time each time it repositions onto a different track to retrieve a block of data. As used herein, the read/write head performs a "seek" when moving to a different track which incurs a "seek time" latency.

Read latency may be incurred when using conventional "single-block" deduplication methods for disk devices. For example, when a file to be written to the storage devices is received, a comparison is performed to determine whether any of the blocks of the received file match any blocks currently stored in the storage devices. As used herein, a "received" file comprises a "received" set of blocks that are processed for deduplication. The received blocks are compared to "currently stored" blocks of "currently stored" files that are presently stored on disk devices 125 of the storage system 120. Note that in some situations (e.g., in offline processing), received blocks may also be currently stored on the storage system 120. In these embodiments, currently stored blocks may be compared to other currently stored blocks to determine if any of the currently stored blocks may be deduplicated.

A received block that matches a currently stored block is referred to as a "redundant block," whereas the corresponding currently stored block is referred to as a "matching stored block." A received block that does not match any currently stored blocks is referred to as a "non-redundant block." A block may be considered to "match" another block when both blocks have the same content or there is a high probability that both blocks have the same content.

Deduplication of a redundant block may comprise deleting from or not storing the redundant block to the storage devices and, producing in their place, an index to the address location of the corresponding matching stored blocks (the index being produced, for example, in the inode for the received file). Any received non-redundant blocks are not deduplicated and are written to the storage devices. For each written non-redundant block, an index to the address location of the non-redundant block where the block was stored may also be produced in the inode for the received file. When a read request for the received file is later received, the storage system may perform the read request by using the inode to index and retrieve the stored non-redundant blocks and, for each redundant block, the corresponding matching stored block.

When the storage devices 125 comprise disk devices, the matching stored blocks may be written on particular tracks 610 of the disk device, whereas the non-redundant blocks of the received file are typically written on different tracks of the disk device. Deduplication of data on disk devices is typically performed on a single-block basis, whereby each individual block found to be redundant is deduplicated. As such, later reading of the received file (using the indexes to the matching stored blocks and non-redundant blocks in the inode for the file) may incur significant read latency if the read/write head frequently seeks and retrieves single blocks stored on different tracks. For example, later reading of the received file may comprise retrieving non-redundant blocks on a first track, seeking and retrieving a single matching stored block on a second track, then seeking and retrieving non-redundant blocks on the first track, then seeking and retrieving a single matching stored block on the second track, etc. As such, conventional "single-block" deduplication methods may result in a later read operation that incurs significant seek latencies.

III. Deduplication of Data Using LLRRM

In some embodiments, deduplication of a received series of blocks is performed using LLRRM. As used herein, a "series" of blocks indicates a set of consecutive/adjacent blocks in a predetermined order. As used herein, blocks of a series are numbered by consecutive "block-series numbers" (BSNs) that indicate the ordering of the blocks in the series. BSNs may be used below in relation to a series of received blocks. Note however, that a series of received blocks may also have associated LBNs assigned by the file system layer 350.

If a matching block is not found to exist, a received block is not deduplicated and is stored to a storage device. If a matching stored block is found to exist, a received block is considered redundant and is deduplicated. Deduplication of the received block may be performed by deleting from or not storing the received block to a storage device and producing an index to the address location of the matching stored block in a mapping mechanism for the received block. In some embodiments, the number of indexes (referred to as "associated indexes) that reference the matching stored block is also checked to determine whether to transfer the matching stored block to LLRRM. The number of associated indexes for a matching stored block may indicate the number of redundant blocks (referred to as "associated deduplicated blocks") that are deduplicated using the matching stored block. In some embodiments, a reference count for a matching stored block represents the number of associated indexes or associated deduplicated blocks of the matching stored block.

In some embodiments, a matching stored block having a predetermined threshold number (THN) of associated indexes (or associated deduplicated blocks) are transferred to LLRRM for storage, the threshold number being one or greater. In some embodiments, the matching stored block is transferred to LLRRM upon the first instance of the stored block matching a received block (i.e., where THN is set to equal one). In other embodiments, the matching stored block is transferred to LLRRM upon two or more instances of the stored block matching a received block (i.e., where THN is set to equal two or greater). When transferred to LLRRM from a storage device, the matching stored block is assigned a new address location in LLRRM. As such, deduplication of the received redundant block may further include producing an index to the new address location of the matching stored block in LLRRM. Also, any prior-produced associated indexes in the mapping mechanism for any prior associated deduplicated blocks may be modified to reflect the new address location of the matching stored block in LLRRM.

In some embodiments, if the matching stored block does not have the threshold number (THN) of associated indexes (or associated deduplicated blocks), the matching stored block is not transferred to LLRRM and the index for the received block is produced using the current address location of the matching stored block. If the matching stored block has a number of associated indexes (or associated deduplicated blocks) that is greater than THN, this indicates that the matching stored block has already been transferred to LLRRM. Thus the current address location of the matching stored block used to produce the index for the received block is the address location of the matching stored block in LLRRM. In contrast, if the matching stored block has a number of associated indexes (or associated deduplicated blocks) that is less than THN, this indicates that the matching stored block has not already been transferred to LLRRM and is still stored on a disk device. Thus the current address location of the matching stored block used to produce the index for the received block is the original address location of the matching stored block on the disk device.

In some embodiments, deduplication is performed using a block-comparison mechanism and a mapping mechanism. It is determined if a received block matches a stored block by querying the block-comparison mechanism. The block-comparison mechanism may comprise metadata entries of currently stored blocks. The received blocks may also be processed to create new metadata entries in the block-comparison mechanism. Based on the results of the query to the block-comparison mechanism, a received block may be deduplicated. If so, an index to the matching stored block is produced in the mapping mechanism which is used to record mappings of deduplicated redundant blocks to their corresponding matching stored blocks on a storage device or in LLRRM. The mapping mechanism may be used to perform later read requests received for deduplicated blocks.

In some embodiments, deduplication methods are used that leverage the particular characteristics and advantages of LLRRM over disk devices. LLRRM may comprise non-volatile, rewritable computer memory having relatively low latency in performing random read requests compared with disk devices. In some embodiments, LLRRM does not comprise a set of tracks for storing data blocks (as do disk devices). Thus, seek operations to read blocks stored on different tracks are not needed when performing read operations on LLRRM (and thereby seek latencies are not incurred in LLRRM). As such, when matching blocks are later read from LLRRM, read latency may be mitigated.

In some embodiments, the deduplication methods described herein are performed by the deduplication layer 275 of the storage operating system 300. In some embodiments, received blocks are processed for deduplication prior to being written to a storage device 125 (referred to as online processing). In these embodiments, the deduplication layer 275 may receive blocks to be written and determine deduplication prior to any of the received blocks being written to a storage device 125. In online processing, storage space may be saved immediately and unnecessary write operations to storage devices 125 are avoided. In other embodiments, blocks are processed for deduplication after being written to a storage device 125 (referred to as offline processing). In these embodiments, the deduplication layer 275 may process blocks currently stored to the storage devices 125 to determine whether deduplication of the stored blocks is needed. In offline processing, if deduplication is performed on blocks found to be redundant, the redundant blocks may be deleted from the storage devices 125.

Figure 7:
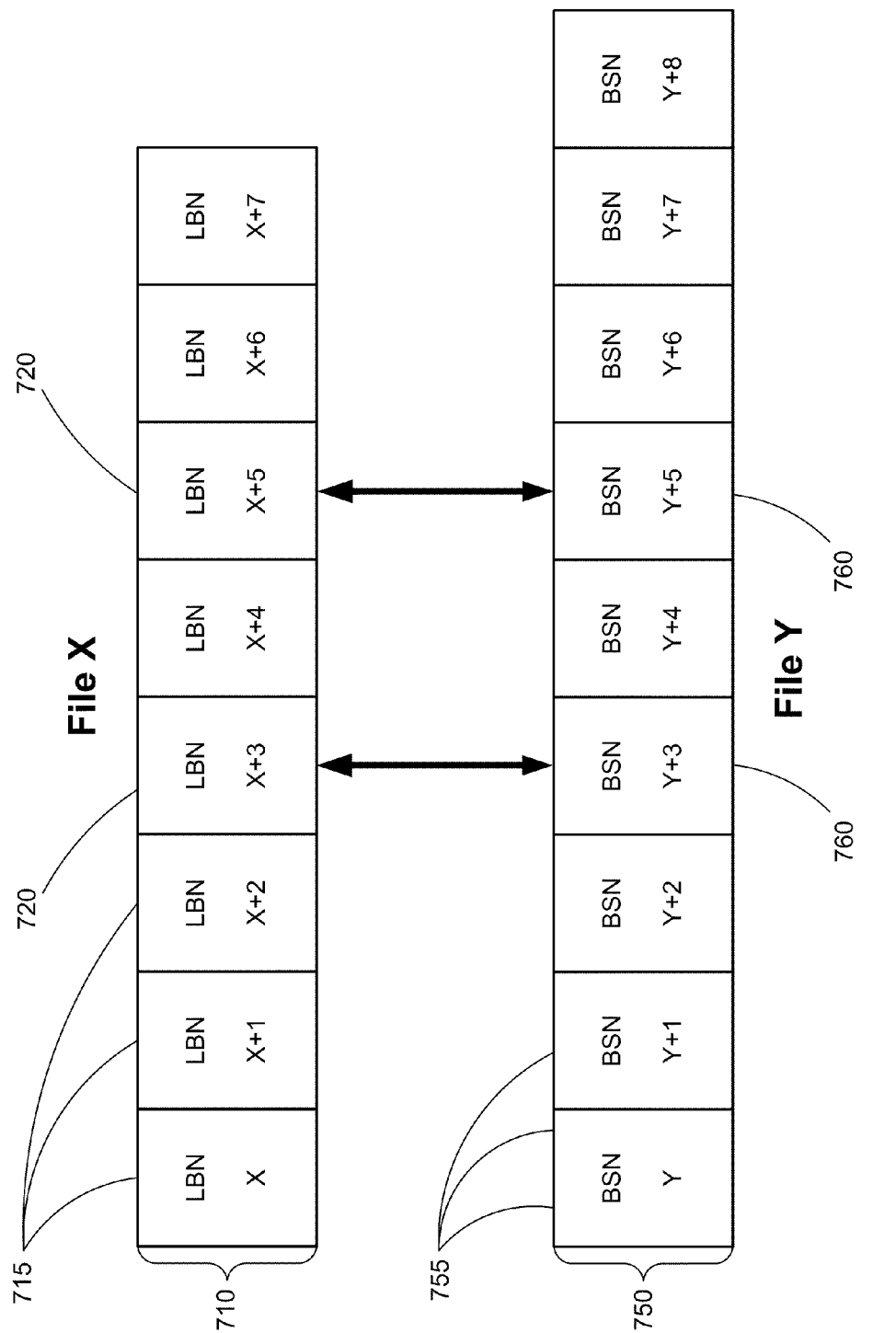
FIG. 7 shows a conceptual diagram of stored file X and received file Y.

FIGS. 7-10 are exemplary conceptual diagrams illustrating deduplication using LLRRM in accordance with some embodiments. FIG. 7 shows a conceptual diagram of a first file 710 ("file X") comprising a plurality of blocks 715 and a second file 750 ("file Y") comprising a plurality of blocks 755. In the example of FIG. 7, file X comprises a currently stored file comprising a series of 8 blocks 715 having LBNs (X, X+1, X+2 . . . X+7), whereby X is the LBN of the first block in the series. In the example of FIG. 7, file Y comprises a received file that is to be processed for deduplication. File Y comprises a series of 9 blocks 755 numbered by BSNs (Y, Y+1, Y+2 . . . Y+8) that indicate the ordering of the blocks in the series, whereby Y is the BSN of the first block in the series.

In the example of FIG. 7, block BSN (Y+3) of file Y matches block LBN (X+3) 720 of file X and block BSN (Y+5) of file Y matches block LBN (X+5) 720 of file X. As such, two redundant blocks 760 in received file Y 750 and are to be deduplicated using two matching blocks 720 in stored file X 710. When deduplicating a redundant block 760, the redundant block 760 is deleted from or not stored to the storage devices 125 and an index to the address locations (e.g., LBN X+3 and LBN X+5) of the corresponding matching block 720 is produced in their place.

Figure 8:
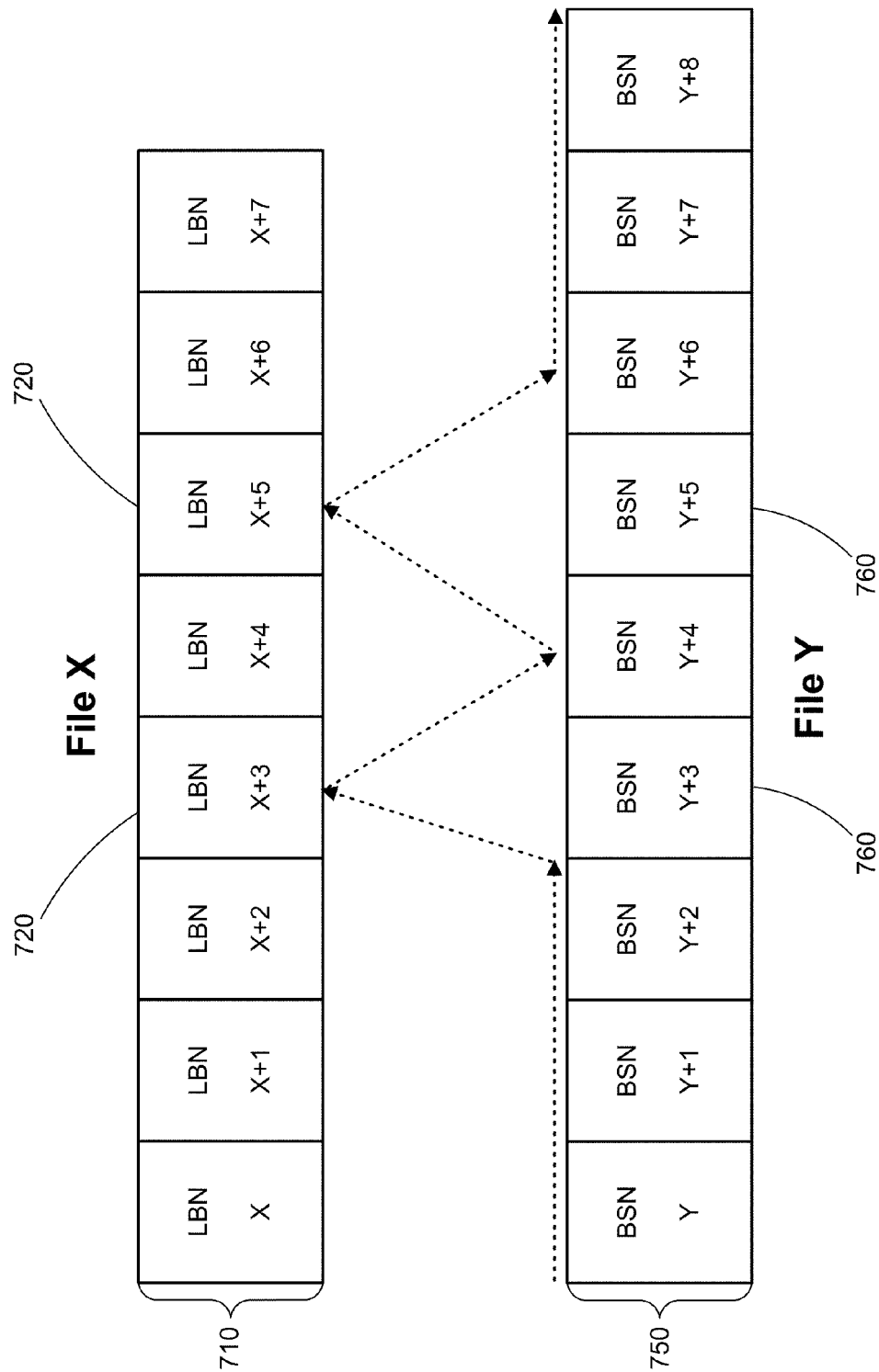
FIG. 8 shows a conceptual diagram of the blocks that comprise the received file Y after deduplication of redundant blocks.

FIG. 8 shows a conceptual diagram of the blocks that will comprise the received file Y after deduplication of the redundant blocks 760 is performed. As shown in FIG. 8, the received file Y will comprise non-redundant blocks BSN (Y) through BSN (Y+2), matching block LBN (X+3), non-redundant block BSN (Y+4), matching block LBN (X+5), and non-redundant blocks BSN (Y+6) through BSN (Y+8).

Figure 9:
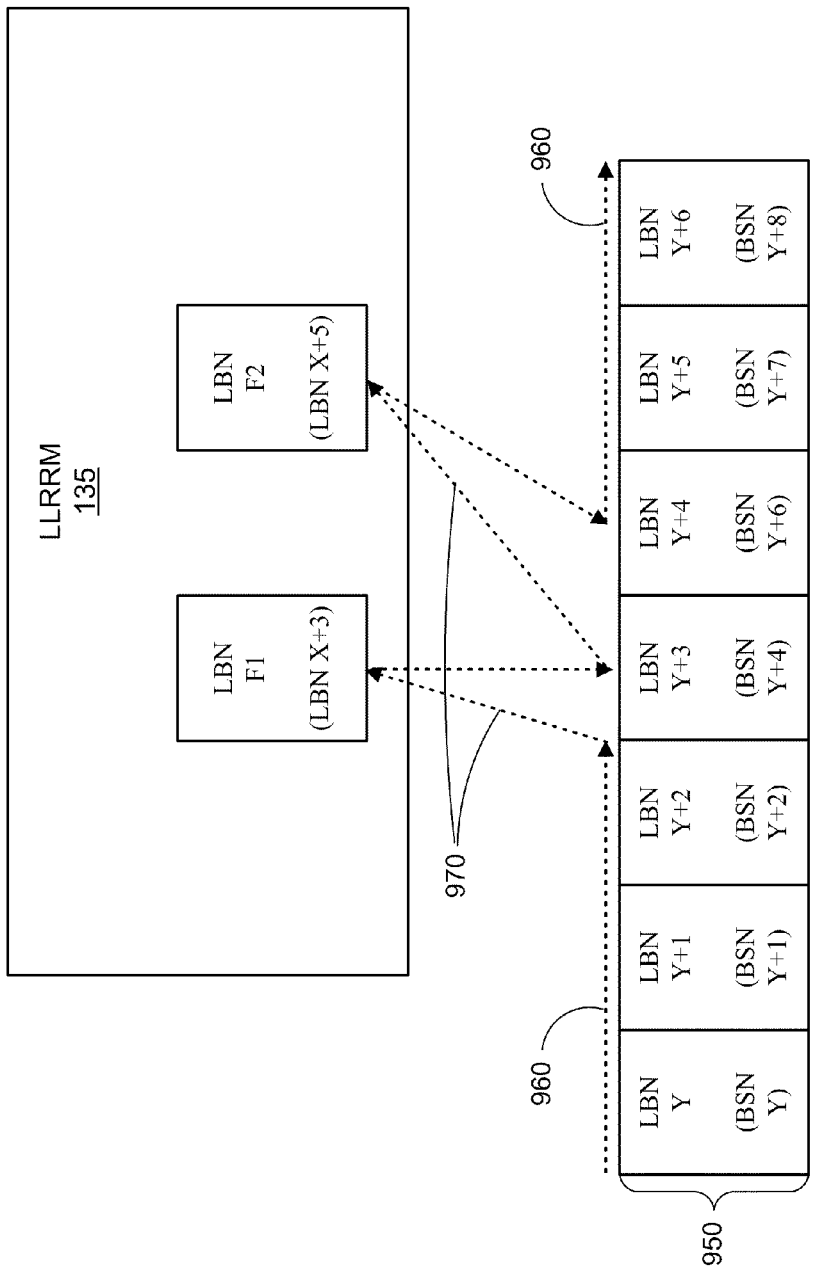
FIG. 9 shows a conceptual diagram of the storage and reading of file Y.

In the example of FIG. 7, it is assumed that each matching block 720 has a threshold number (THN) of associated indexes and thus are assigned new address locations in LLRRM and are transferred to LLRRM for storage. As such, FIG. 9 shows a conceptual diagram of the storage of the blocks of file Y and the operations of a read request for file Y after the matching blocks 720 have been transferred to LLRRM 135. In the example of FIG. 9, non-redundant blocks BSN (Y) through BSN (Y+2), BSN (Y+4), and BSN (Y+6) through BSN (Y+8) of file Y are stored on a first track 950 of a disk device (and have assigned LBNs (Y) through LBN (Y+6), respectively). The matching block LBN (X+3) has a new address location (e.g., LBN F1) and matching block LBN (X+5) has a new address location (LBN F2) in LLRRM 135.

Figure 10:
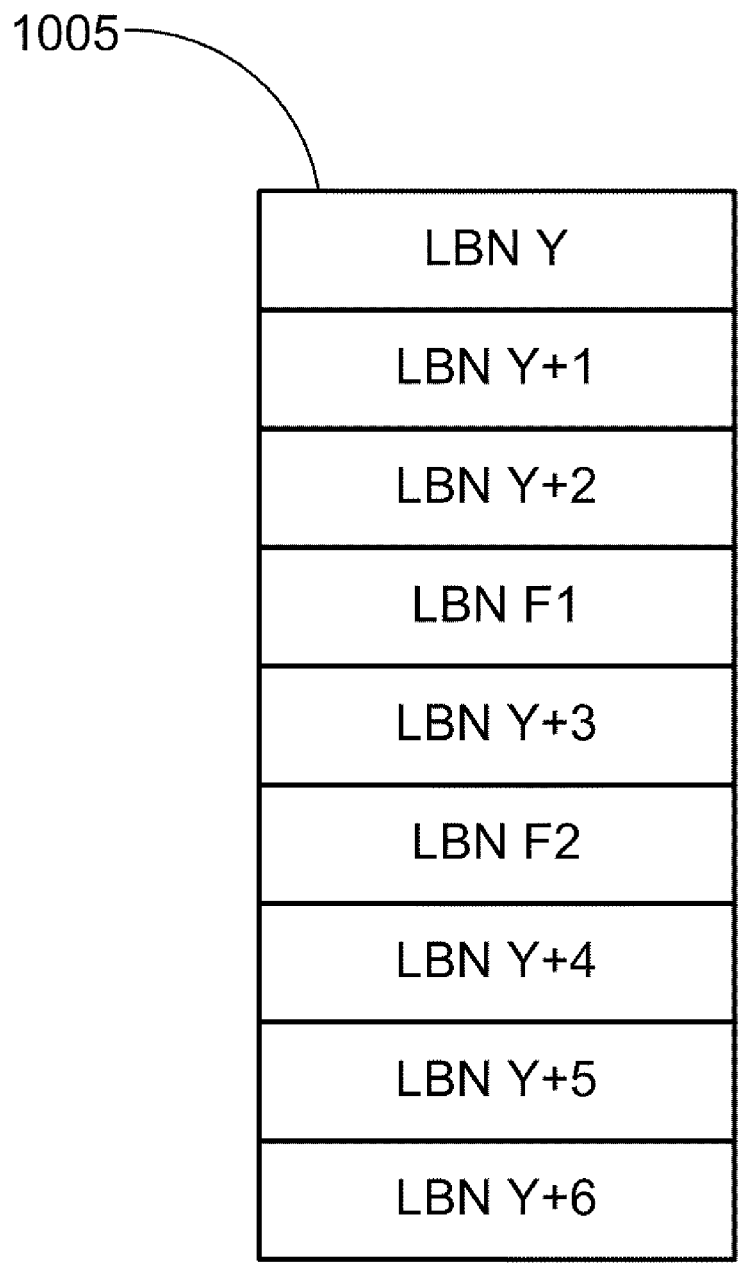
FIG. 10 shows a conceptual diagram of an inode associated with file Y.

FIG. 10 shows a conceptual diagram of an inode 1005 associated with file Y that stores the LBNs of each block of file Y (in accordance with FIG. 9). The LBNs of the blocks of file Y are stored in the inode 1005 in the particular order needed to properly read the blocks of file Y. When a later read request is received for file Y, the storage operating system 300 would retrieve the associated inode 1005 and retrieve the blocks at the LBNs stored in the associated inode 1005, the blocks being retrieved in the particular order specified in the associated inode 1005.

In the example of FIG. 9, when a read request for file Y is later received, the read request is performed according to the associated inode 1005 of file Y. As such, the read request would be performed as follows: sequential read 960 on blocks having LBNs (Y) through LBN (Y+2) on the first track 950, random read 970 on the LLRRM 135 to retrieve LBN (F1), read block LBN (Y+3) on the first track 950, random read 970 on the LLRRM 135 to retrieve LBN (F2), and sequential read 960 on blocks having LBNs (Y+6) through LBN (Y+8) on the first track 950.

Under typical deduplication methods, the matching blocks 720 of file X would be stored on a second track of the disk device. As such, upon later reading of file Y, matching blocks LBN (X+3) and LBN (X+5) would be retrieved from the second track of the disk device, thus incurring seeks times for each matching block that is retrieved. Thus, the above example illustrates how read latency of the received blocks of file Y may be mitigated using LLRRM 135 since random reads 970 are then performed on LLRRM 135 rather than seek operations performed across different tracks on a disk device.

IV. Block-Comparison and Mapping Mechanisms

A. Introduction

In some embodiments, the deduplication layer 275 performs deduplication of blocks using a block-comparison mechanism and a mapping mechanism. The deduplication layer 275 receives a series of blocks for processing. The received blocks may be contained in a file (for file-based access) or not contained in a file (for block-based access). The received blocks may have not yet been written to a disk device (in online processing), whereby any received blocks that are found to be redundant and deduplicated are not subsequently written to a disk device. The received blocks may have already been written to a disk device (in offline processing), whereby any received blocks that are found to be redundant and deduplicated may be deleted from the disk device.

The deduplication layer 275 determines whether a received block matches a currently stored block by querying the block-comparison mechanism. In some embodiments, the block-comparison mechanism comprises the metadata structure 290 which contains a plurality of metadata entries representing a plurality of currently stored blocks. The deduplication layer 275 also processes the received blocks to create new metadata entries for the received blocks in the metadata structure 290. In some embodiments, a metadata entry representing a stored block includes a reference count indicating the number of indexes (associated indexes) that reference the stored block. As such, the reference count may indicate how many blocks (associated deduplicated blocks) are deduplicated using the stored block. In some embodiments, the metadata structure 290 is resident in memory 240 or NVRAM 245, stored on a storage device 125, and/or stored on an LLRRM device 135.

Based on the results of the query to the block-comparison mechanism, it is determined whether a matching stored block has been found. If so, the received block is deduplicated using the matching stored block by deleting from or not storing the received block to the storage devices and producing a reference/index to the address location of the matching stored block. The deduplication layer 275 may then increase the reference count in the metadata entry for the matching stored block in the metadata structure 290. The deduplication layer 275 then determines whether the reference count (i.e., the number of associated indexes or associated blocks) is equal to the predetermined threshold number (THN).

If the reference count is equal to the predetermined threshold number, the matching stored block is transferred to LLRRM for storage, the matching stored block having a new address location in LLRRM. Each associated index of the matching block is then modified in the mapping mechanism to reflect the new address location of the matching stored block in LLRRM. As such, an index for the received block is produced in the mapping mechanism using the new address location of the matching stored block in LLRRM. Also, any prior-produced associated indexes in the mapping mechanism for any prior associated deduplicated blocks are also modified to reflect the new address location of the matching stored block in LLRRM. If the reference count is not equal to the predetermined threshold number, the matching stored block is not transferred to LLRRM and an index for the received block is produced in the mapping mechanism using the current address location of the matching stored block (whether on a disk device or LLRRM).

Also, in offline processing (where the received block may have already been written to a disk device), deduplication of the received block may further comprise deleting the received block from the disk device. In online processing (where the received block have not yet been written to a disk device), deduplication of the redundant received block may comprise not subsequently storing the received block to a disk device.

The mapping mechanism is used to record mappings of deduplicated redundant blocks to their corresponding matching stored blocks whether in LLRRM or on a storage device. The mapping mechanism may be used by the storage operating system 300 to perform later read requests received for the received blocks. In some embodiments, for file-based access, the mapping mechanism comprises the set of inodes associated with the files of the storage system 120. In some embodiments, for block-based access, the mapping mechanism comprises the metadata structure 290 which contains mapping entries of deduplicated blocks.

As such, the deduplication layer 275 uses the block-comparison mechanism for performing two general functions in relation to a received series of blocks. Function 1 (the comparison function) is to determine whether a received block matches a currently stored block, whereby the received block may then be deduplicated. Note that in the comparison function, although the received block of received blocks have assigned LBNs, the BSNs (rather than the assigned LBNs) of the received blocks are used in the comparison function. Function 2 (the entry function) is to process the received series of blocks to produce new metadata entries in the block-comparison mechanism for possible use in deduplicating subsequently received blocks. In the entry function, the assigned LBNs of the received blocks may be used since the entries in the block-comparison mechanism are based on address locations.

B. Metadata Structure

FIG. 11 shows a conceptual diagram of an exemplary block-comparison mechanism comprising a metadata structure 290. The metadata structure 290 contains metadata for "stored blocks" that are currently stored on a storage device 125 or LLRRM 135 or are awaiting to be stored on a storage device 125 or LLRRM 135 (and have assigned LBNs). In the example of FIG. 11, the metadata structure 290 comprises a plurality of metadata entries 1101, a metadata entry representing a corresponding stored block. The metadata structure 290 may implement an indexing system to organize the metadata entries 1101 to provide efficient entry lookups in the metadata structure 290. For example, the entries 1101 may be indexed using checksum or hashing algorithms (discussed below).

In some embodiments, a metadata entry 1101 for a corresponding stored block may comprise fields for a content identifier 1105, an address location on a disk device 1120, an address location on an LLRRM device 1125, a reference count 1130, a set of zero or more pointers 1135 to zero or more associated indexes, or any combination of these. The metadata structure 290 may contain a metadata entry 1101 for each stored block. In the example of FIG. 11, the THN value is set to equal two.

The content identifier 1105 represents the data contents of the blocks of the corresponding stored block and is produced using a content identifier operation/algorithm on the data contents of the stored block. The content identifier 1105 may be used as an index for the corresponding entry. The type of content identifier 1105 used may be such that two blocks having the same content identifier have a high probability of also having the same data content.

In some embodiments, the content identifier of a block is determined using a checksum operation/algorithm that produces a checksum value representing the data contents of the block, the checksum value comprising the content identifier. For example, a checksum value may comprise a 128 or 256 bit number that represents the data contents of a block. As known in the art, when two blocks have the same checksum value, there is a high probability that the two blocks have the same data content, whereby only in rare instances is this not true. In other embodiments, the content identifier is determined by applying a hashing operation/algorithm to the checksum value that produces a hash value representing the data contents of the block, the hash value comprising the content identifier. In further embodiments, the content identifier is determined using other operations/algorithms.

The address location on a disk device 1120 indicates the original address location (e.g., LBN D1, etc.) of the corresponding stored block on a disk device where the block is/was originally stored. The address location on LLRRM device 1125 indicates the new address location (e.g., LBN F1, etc.) of the corresponding stored block in LLRRM (if the block has been transferred to LLRRM). For example, for file-based access, an address location 1120 or 1125 may comprise a file identifier and the LBN of the stored block. For block-based access, the address location 1120 or 1125 may comprise the LBN of the stored block. Note that in the example of FIG. 11, THN is set to equal two. Thus, entries 1101 with a reference count 1130 of two or greater have an address location in LLRRM 1125 (since only these entries represent matching stored blocks that have been transferred to LLRRM).

The reference count 1130 may indicate how many blocks index the corresponding stored block. In some embodiments, the reference count 1130 comprises a number of indexes (associated indexes) that reference the corresponding stored block. In other embodiments, the reference count 1130 comprises the number of redundant blocks (associated deduplicated blocks) that match (in data content) the corresponding stored block and are deduplicated using the corresponding stored block.

In some embodiments, each associated index of a stored block is stored in a mapping mechanism, each associated index having a unique address location (e.g., LBN) where the index is stored within the mapping mechanism. Note that the associated index may comprise the address location of the corresponding stored block (e.g., the LBN of the stored block on a disk device 1120 or an LLRRM device 1125). In some embodiments, the address location of the corresponding stored block may be modified if it is transferred to LLRRM. As such, a pointer 1135 to each associated index may be produced in and stored in a metadata entry 1101 for a stored block. In some embodiments, a pointer 1135 to an associated index comprises an address location (e.g., LBN) of the associated index within the mapping mechanism. For example, for a reference count equal to 3 (indicating 3 associated indexes), three pointers 1135 are produced (e.g., P1, P2, P3) and stored in the entry 1101, one pointer for each associated index. Upon the corresponding stored block being transferred to LLRRM, the deduplication layer 275 may use the pointers 1135 to locate the associated indexes and modify the associated indexes using the new address location of the corresponding stored block in LLRRM.

C. Comparison Function of the Block-Comparison Mechanism

In some embodiments, when the deduplication layer 275 receives a series of blocks for processing, the deduplication layer 275 may first perform a comparison function using the metadata structure 290 to determine whether any of the received blocks may be deduplicated. The deduplication layer 275 may process each received block by determining a content identifier that represents the data contents of the received block. The content identifier for the received block may be produced using the steps used to produce the content identifiers 1105 in the metadata structure 290. For example, the content identifier of the received block may be determined by applying a checksum operation to the block, and applying a hashing operation to the checksum to produce a hashing value that comprises the content identifier for the block.

The deduplication layer 275 then queries the metadata structure 290 using the content identifier for the received block. If a matching content identifier 1105 is found in the metadata structure 290, this indicates a matching entry 1101 has been found that represents a matching stored block. As discussed above, the type of content identifier is used such that two blocks having the same content identifier have a high probability of also having the same data content (for example, when using a checksum or hash value). As such, there is a high probability that the matching stored block represented by the matching entry has the same data content as the received block. As an optional step, the deduplication layer 275 may confirm this is true by comparing the contents of the received block with the matching block. When a matching content identifier 1105 and matching entry 1101 is found in the metadata structure 290, the received block is deduplicated using the corresponding matching stored block.

The comparison function is performed for each received block in the series of received blocks. After processing of all received blocks, any blocks that are not considered redundant and deduplicated are non-redundant blocks that are to be stored to a storage device 125. The non-redundant blocks are then processed according to the entry function of the deduplication layer 275.

D. Entry Function of the Block-Comparison Mechanism

Received blocks that are not deduplicated are referred to as the set of non-deduplicated blocks. The entry function of the deduplication layer 275 processes the non-deduplicated blocks to produce new entries 1101 in the block-comparison mechanism (e.g., metadata structure 290) for possible use in deduplicating subsequently received blocks. The non-deduplicated blocks have address locations (e.g., LBNs) assigned by the file system layer 350 indicating where the non-deduplicated blocks are to be stored on a storage device 125.

For each non-deduplicated block in the set, the deduplication layer 275 produces a metadata entry 1101 having particular metadata regarding the non-deduplicated block in the metadata structure 290. The deduplication layer 275 may do so by producing a content identifier for the non-deduplicated block and using the content identifier as an index to store the metadata entry 1101 in the metadata structure 290. For example, the content identifier may comprise a checksum or hash value.

When initially producing the metadata entry 1101 for the non-deduplicated block, the metadata entry 1101 may comprise the content identifier 1105, the address location on a disk device 1120 (e.g., the LBN assigned to the non-deduplicated block), and the reference count 1130 (which is initially set to zero). The other metadata fields (e.g., address location on an LLRRM device 1125, a set of zero or more pointers 1135) may initially have null values and may subsequently be modified by the deduplication layer 275 if later received blocks match the non-deduplicated block. The deduplication layer 275 may repeat the process for each non-deduplicated block in the set.

E. Mapping Mechanism

When the deduplication layer 275 deduplicates a redundant received block, it produces an index in the mapping mechanism to the matching block in place of the redundant received block. The index may comprise, for example, the address locations (e.g. LBNs) on a disk device or LLRRM of the matching block. As such, the mapping mechanism is used to record mappings of deduplicated redundant blocks to their corresponding matching stored blocks. The mapping mechanism may be used by the storage operating system 300 to perform later read requests received for deduplicated redundant blocks.

In some embodiments, for file-based access (using, for example, CIFS or NFS protocols), the mapping mechanism comprises the set of inodes associated with the files of the storage system 120, the inodes being maintained by the file system layer 350. In these embodiments, when blocks of a file are deduplicated, the deduplication layer 275 produces indexes (LBNs) to the matching blocks in the inode of the file (as discussed above in relation to FIG. 10). In other embodiments, the deduplication layer 275 may send a request to the file system layer 350 that maintains the inodes to produce the appropriate indexes in the appropriate inode. Later read requests received for a file having deduplicated redundant blocks may then be performed by the storage operating system 300 by using the inode for the file and the LBNs contained in the inode (as per usual). In these embodiments, a pointer 1135 to an associated index of a matching block comprises an address location of the associated index in the inode for the file having the deduplicated redundant block.

In some embodiments, for block-based access (for example, in SAN or iSCSI access), the mapping mechanism comprises the metadata structure 290 which further contains mapping entries of deduplicated blocks. In other embodiments, the mapping mechanism comprises a data structure that is separate from the metadata structure 290. FIG. 12 shows a conceptual diagram of an exemplary mapping mechanism comprising a metadata structure 290. In these embodiments, in addition to the plurality of metadata entries 1101, the metadata structure 290 further comprises a plurality of mapping entries 1201, one mapping entry 1201 for each deduplicated block.

A mapping entry 1201 may comprise an assigned location 1205 (e.g., an LBN assigned by the file system layer 350) for a deduplicated block and an index 1210 (e.g., address location on a disk device or LLRRM) to a corresponding matching stored block. For example, a mapping entry 1201 may comprise the assigned LBN 1205 for a deduplicated block and an LBN on a disk device (Dn) 1210 or an LBN in LLRRM (Fn) 1210 for the corresponding matching stored block. In these embodiments, a pointer 1135 to an associated index of a matching block comprises an address location of the index 1210 in the corresponding mapping entry 1201 in the metadata structure 290.

Later read requests received for deduplicated blocks may then be performed by the storage operating system 300 by using the metadata structure 290. Each read request will specify address locations (e.g., LBNs) of deduplicated blocks to be read. The metadata structure 290 may then be used to map the LBNs of the deduplicated blocks (received in the read request) to LBNs of the corresponding matching blocks (whereby the data of the corresponding matching blocks are retrieved using the LBNs).

F. De-Staging Layer

In some embodiments, the deduplication layer 275 may be used in conjunction with a de-staging layer 375. In these embodiments, the deduplication layer 275 may process the write logs accumulated during a first stage that are awaiting the next consistency point to be written to a storage device 125. During this time, the deduplication layer 275 may process the blocks in the accumulated write logs for possible deduplication before the blocks are written to the storage devices 125. When the deduplication layer 275 is used with a de-staging layer 375, additional steps may be used when deduplicating blocks.

As discussed above, a write log for a write request for a file produced in the first stage may comprise data of the blocks to be written, the locations (LBNs) of where the blocks are to be written, and an assigned inode number. When a write log for a write request for a file is produced in the first stage, the file system layer 350 may also store LBNs for each block of the file in its assigned inode.

As such, when redundant blocks are deduplicated according to the embodiments herein, the write logs containing the deduplicated blocks may be modified to reflect the deduplication. For example, modifications to a write log containing deduplicated blocks may include deleting the deduplicated blocks from the write log and removing the address locations (e.g., LBNs) of the deduplicated blocks from the write log. These additional steps may be performed since the deduplicated blocks should not be written to the storage devices 125. As such, when the write log is later sent to the storage layer 380, the write log only contains non-deduplicated blocks which are written to a storage device 125 in the second stage.

G. Threshold Number

As described above, in some embodiments, a matching stored block having a predetermined threshold number (THN) of associated indexes (or associated deduplicated blocks) are transferred to LLRRM for storage, the threshold number being one or greater. In some embodiments, the matching stored block is transferred to LLRRM upon the first instance of the stored block matching a received block (i.e., where THN is set to equal one). In other embodiments, the matching stored block is transferred to LLRRM upon having two or more instances of the stored block matching a received block (i.e., where THN is set to equal two or greater).

As such, the threshold number may be varied to control the number of matching blocks that are stored to LLRRM. For example, if the storage size amount of LLRRM is relatively low, the threshold number may be set to a relatively high number to reduce the number of matching blocks that are stored to LLRRM. Or if the storage size amount of LLRRM is relatively high, the threshold number may be set to a relatively low number to increase the number of matching blocks that are stored to LLRRM.

Further, if the amount of LLRRM is limited, the threshold number may also be varied to transfer only those matching blocks to LLRRM that have a certain expected frequency level for future reads (the expected frequency level for future reads being reflected by the number of associated indexes or associated deduplicated blocks). For example, if a matching block has a relatively high number of associated indexes or associated deduplicated blocks, the matching block has a relatively higher expected frequency level for future reads. As such, if it is determined that only matching blocks having a relatively high frequency level of expected future reads are to be transferred to LLRRM, the threshold number may be set to a relatively high number.

In some embodiments, the deduplication layer 275 comprises a parameter interface 280 (as shown in FIG. 2) that receives the threshold number as a parameter to dynamically change the threshold number. In some embodiments, the parameter is received from a user through the parameter interface 280 which comprises a user interface (such as, a graphical user interface or command line interface). In other embodiments, the parameter may be received from a program through the parameter interface 280 which comprises a program interface, such as, an application program interface (API). The received parameter may dynamically change the threshold number used by the deduplication layer 275 without requiring the software code of the deduplication layer 275 to be modified.

V. Methods for Deduplication Using LLRRM

Figure 13A:
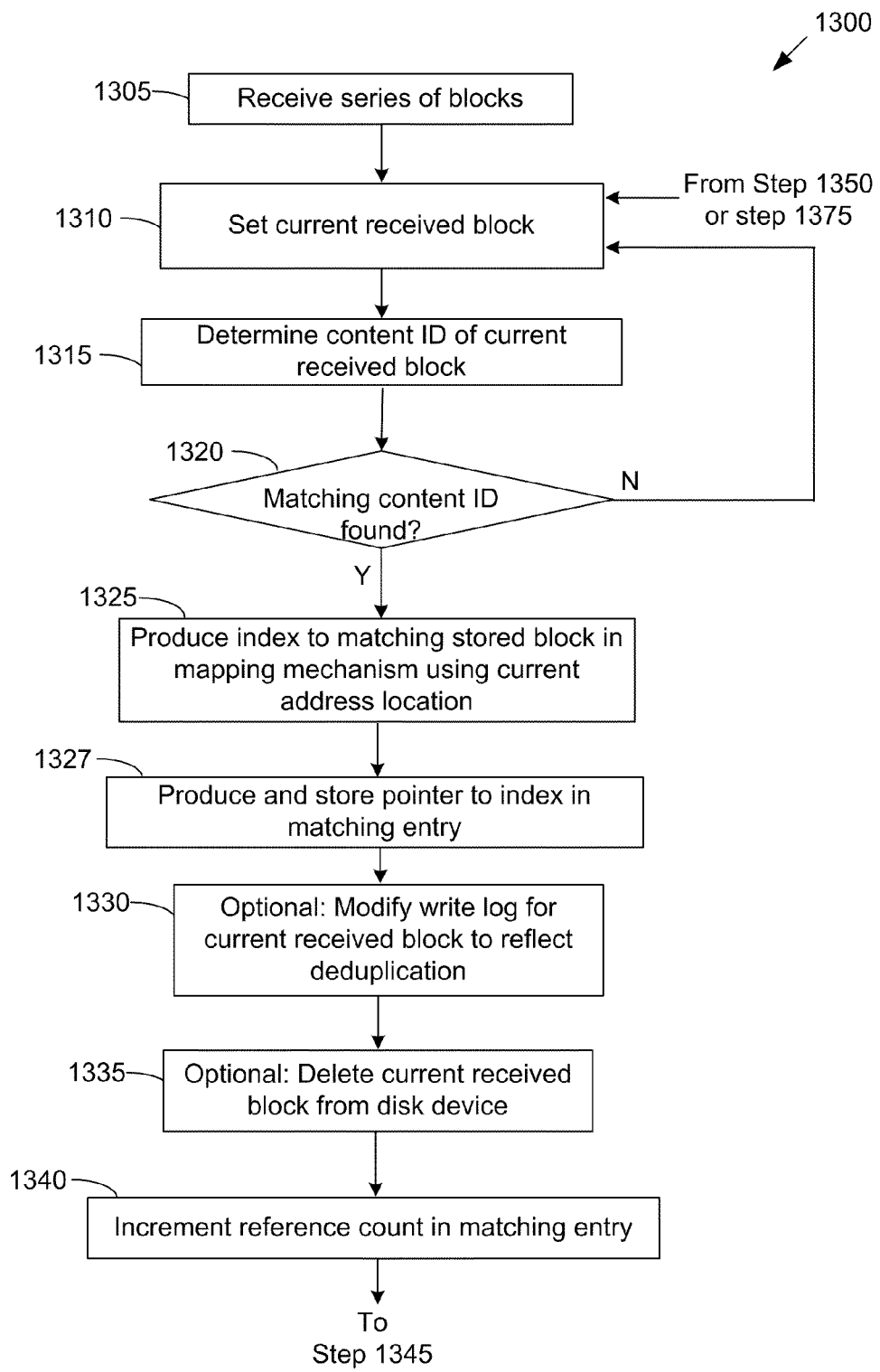
FIGS. 13A-B are flowcharts of a method for deduplication of data using LLRRM.
Figure 13B:
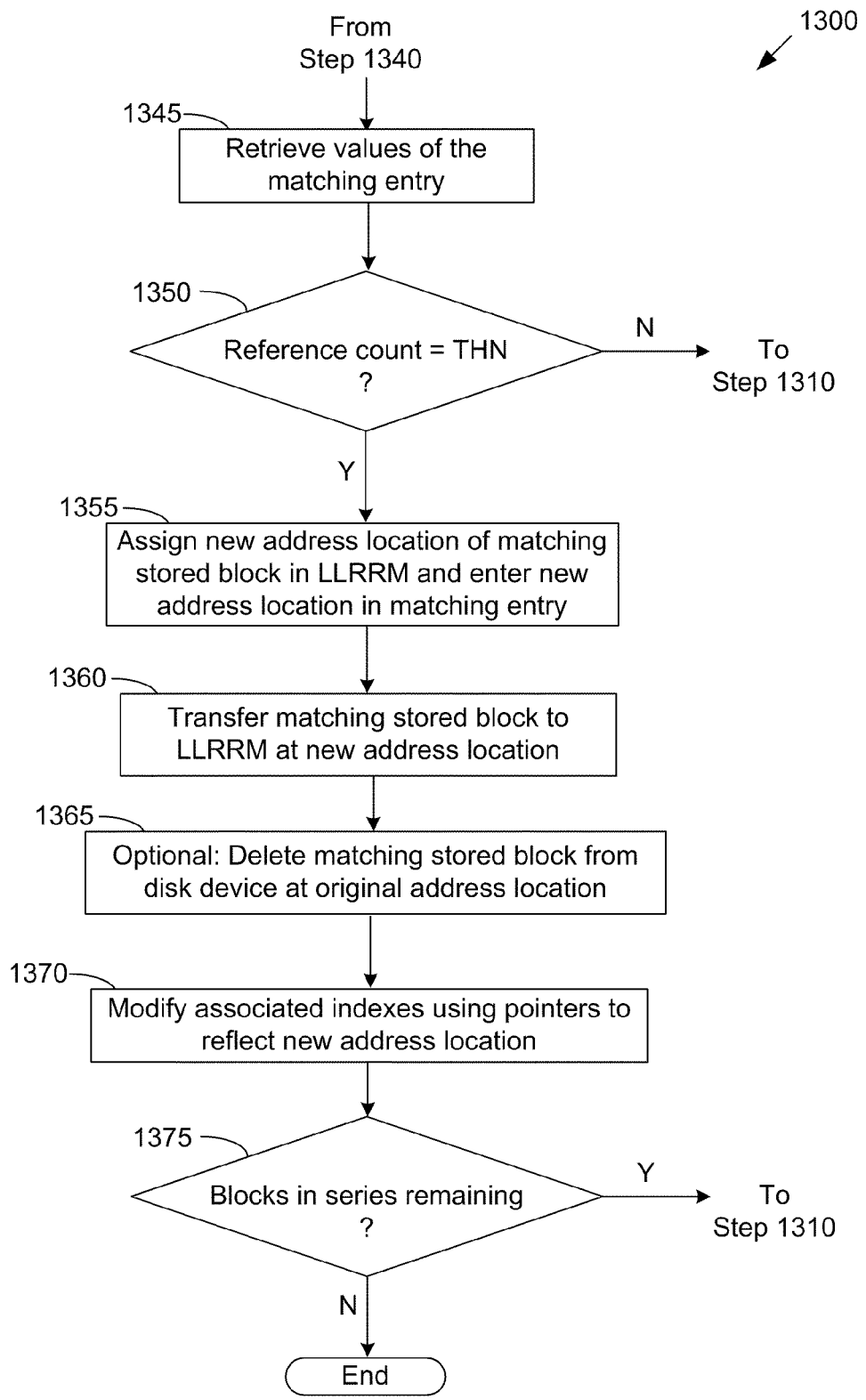

FIGS. 13A-B are flowcharts of a method 1300 for deduplication of data using LLRRM. In some embodiments, some of the steps of the method 1300 are implemented by software or hardware. In some embodiments, some of the steps of method 1300 are performed by the deduplication layer 275 of the storage operating system 300 and comprise the comparison function of the deduplication layer. The order and number of steps of the method 1300 are for illustrative purposes only and, in other embodiments, a different order and/or number of steps are used.

In some embodiments, some steps (such as steps 1305 through 1320) of the method 1300 may comprise a single-block deduplication method, whereas other steps (such as steps 1325 through 1375) of the method 1300 may comprise modifications of the single-block deduplication method to use LLRRM. In other embodiments, some steps (such as steps 1305 through 1320) of the method 1300 may comprise other deduplication methods. In some embodiments, the deduplication layer 275 may comprise an external auxiliary plug-in type software module that works with pre-existing deduplication software to enhance functions of the deduplication software as described herein.

The method 1300 begins when the deduplication layer 275 receives (at 1305) a series of blocks for processing to determine whether any of the received blocks may be deduplicated. The received blocks may be contained in a file (for file-based requests) or not contained in a file (for block-based requests). A received block in the series is set (at 1310) as a current received block. The deduplication layer 275 then determines (at 1315) a content identifier (e.g., checksum or hash value) for the current received block that represents the data contents of the current received block. The deduplication layer 275 then determines (at 1320) whether the content identifier for the current received block matches any content identifiers 1105 in the block-comparison mechanism (e.g., metadata structure 290). If a matching content identifier 1105 is not found, the method 1300 continues at step 1310 where a next received block in the series is set as the current received block.

If a matching content identifier 1105 is found in the metadata structure 290, this indicates a matching entry 1101 has been found that represents a matching block. As such, a matching block has been found to exist and the current received block is considered redundant and may be deduplicated. To deduplicate the current received block, the deduplication layer 275 produces (at 1325) an index to the current address location in the mapping mechanism using the current address location to the matching block. In some embodiments, if the matching entry 1101 contains an address location in LLRRM 1125, this indicates the matching stored block has been transferred to LLRRM. As such, the current address location comprises the address location in LLRRM 1125. If the matching entry 1101 does not contain an address location in LLRRM 1125, this indicates the matching stored block has not been transferred to LLRRM. As such, the current address location comprises the address location on a disk device 1120.

A pointer 1135 to the index is then produced and stored (at 1327) in the matching entry 1101. The pointer 1135 may comprise an address location (e.g., LBN) of the index within the mapping mechanism. In some embodiments, for file-based access, the deduplication layer 275 produces the index in the inode of the file containing the current received block. In these embodiments, the pointer 1135 comprises an address location of the index in the inode for the file having the received block. In some embodiments, for block-based access, the deduplication layer 275 produces the index by producing a new mapping entry 1201 in the metadata structure 290. In these embodiments, the pointer 1135 comprises an address location of the index 1210 in the corresponding mapping entry 1201 in the metadata structure 290.

As an optional step, if a de-staging layer 375 is implemented in the storage operating system 300, the write log containing the current received block is modified (at 1330) to reflect the deduplication of the current received block. For example, the modifications to the write log may include deleting the data content and the LBN of the current received block from the write log. As an optional step, in offline processing (where the current received block may have already been written to a disk device), the method 1300 deletes (at 1335) the current received block from the disk device. In online processing (where the received block has not yet been written to a disk device), the blocks of the current received block is not subsequently stored to a disk device.

The method 1300 then increments (at 1340) the reference count 1130 in the matching entry 1101 and retrieves (at 1345) one or more field values from the matching entry 1101. In some embodiments, the retrieved values may include the address location on a disk device 1120, an address location on an LLRRM device 1125, a reference count 1130, and/or a set of pointers 1135 to associated indexes. The method then determines (at 1350) whether the reference count 1130 (indicating the number of associated indexes or associated deduplicated blocks of the matching stored block) is equal to THN. If not, the method continues at step 1310 where a next received block in the series is set as the current received block.

If the reference count 1130 is equal to THN, the deduplication layer 275 assigns (at 1355) a new address location (e.g., within memory sub-range of address locations) in LLRRM for the matching stored block and stores (at 1355) the address location in LLRRM 1125 in the matching entry. The method then transfers (at 1360) the matching stored block to LLRRM at the new address location. In some embodiments, the transfer is performed by copying the matching stored block from a disk device (using the address location on a disk device 1120) and storing to the address location in LLRRM 1125. As an optional step, the method 1300 deletes (at 1365) the matching stored block from the disk device at the original address location on the disk device 1120.

The method then modifies (at 1370) each associated index of the matching block in the mapping mechanism to reflect the new address location of the matching stored block in LLRRM. The method may do so using the set of pointers 1135 contained in the matching entry 1101 to locate the associated indexes in the mapping mechanism. The method then determines (at 1375) if any received blocks in the received series remain for processing. If so, the method continues at step 1310 where a next received block in the series is set as the current received block. If not, the method ends.

The above method 1300 is performed for each received block. After processing of all received blocks, any blocks that are not deduplicated are non-deduplicated blocks that are to be stored to a storage device 125. The non-deduplicated blocks are then processed according to the entry function of the deduplication layer 275 to create metadata entries for a set of zero or more non-deduplicated blocks.

Figure 14:
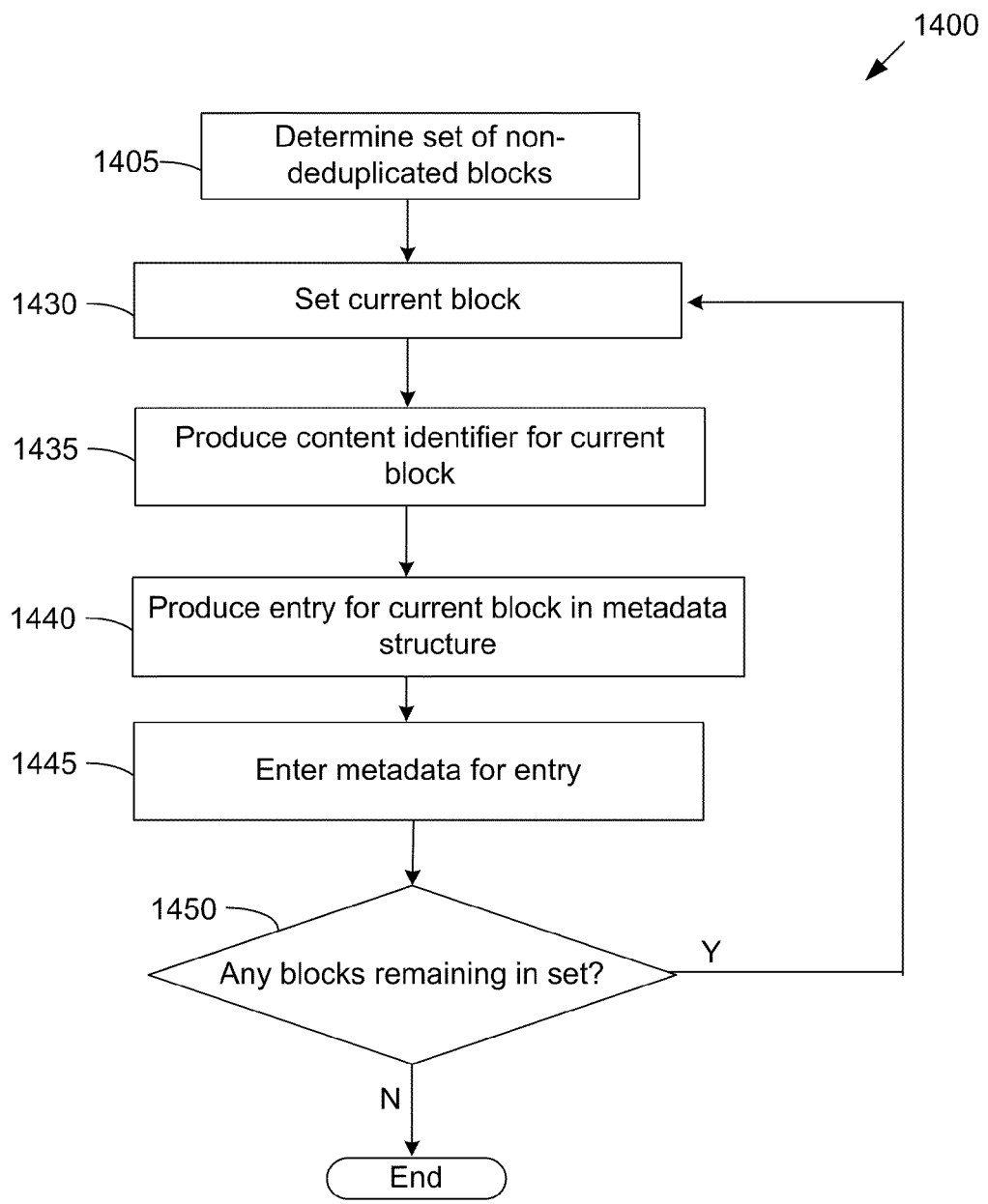
FIG. 14 is a flowchart of a method for producing new metadata entries in the block-comparison mechanism.

FIG. 14 is a flowchart of a method 1400 for processing the non-deduplicated blocks to produce new metadata entries 1101 in the block-comparison mechanism (e.g., metadata structure 290) for possible use in deduplicating subsequently received blocks. In some embodiments, some of the steps of the method 1400 are implemented by software or hardware. In some embodiments, some of the steps of method 1400 are performed by the deduplication layer 275 of the storage operating system 300 and comprise the entry function of the deduplication layer. The order and number of steps of the method 1400 are for illustrative purposes only and, in other embodiments, a different order and/or number of steps are used. Note that the non-deduplicated blocks have address locations (e.g., LBNs) assigned by the file system layer 350 indicating where the non-deduplicated blocks are to be stored on a storage device 125.

The method 1400 begins by determining (at 1405) a set of non-deduplicated blocks for processing. A non-deduplicated block in the set is set (at 1430) as a current block. The deduplication layer 275 produces (at 1435) a content identifier (e.g., checksum or hash value) for the current block. The deduplication layer 275 then produces (at 1440) an entry for the current block using the produced content identifier as an index to store the entry into the metadata structure 290.

The deduplication layer 275 then enters (at 1445) particular metadata for the entry 1101. For example, the entry 1101 may comprise the content identifier 1105, the address location on a disk device 1120 (e.g., the LBN assigned to the non-deduplicated block), and the reference count 1130 (which is initially set to zero). The other metadata fields (e.g., address location on an LLRRM device 1125, a set of zero or more pointers 1135) may initially have null values and may subsequently be modified by the deduplication layer 275. The method then determines (at 1450) if any blocks remain in the set for processing. If so, the method continues at step 1430 where a next block in the set of blocks is set as the current block. If not, the method ends.

VI. Deduplication Based on Threshold Number of Sequential Blocks Using LLRRM

Although typically LLRRM may have faster random read access times than a disk device, LLRRM may be more costly (for a given amount of data storage) than disk devices. Given the relatively higher cost of LLRRM, it may be desirable to be selective in determining which blocks should be transferred to the LLRRM and it may still be desirable to store some matching blocks on a disk device in some situations.

In some embodiments, the deduplication methods and apparatus using LLRRM described above (referred to as the "LLRRM" method and apparatus) are used in combination with a deduplication method and apparatus for disk devices based on a threshold number (THN) of sequential blocks (referred to herein as the "THN sequence" method and apparatus), which are described in U.S. patent application Ser. No. 12/110,122, entitled "Deduplication of Data on Disk Devices Based on a Threshold Number of Sequential Blocks," by Kiran Srinivasan, et al., filed herewith, and incorporated herein by reference.

The THN sequence processing/method provides deduplication of data on disk devices based on a predetermined threshold number (THN) of sequential blocks, the threshold number being two or greater. In these embodiments, deduplication may be performed by determining whether a series of THN or more received blocks (referred to herein as a "THN series") match (in data content) a sequence of THN or more stored blocks (referred to herein as a "THN sequence"). In some embodiments, a "sequence" of blocks indicates a series of blocks stored on the same track of a disk device. Blocks of a sequence have consecutive address locations (e.g., LBNs). If a matching THN sequence is found to exist, the blocks in the THN series may be deduplicated on the disk devices. Deduplication based on a threshold number of sequential blocks may also reduce the overall read latency of a file or set of blocks as the number of seeks between tracks may be reduced on the disk devices.

For example, if the value of THN equals 5 and a series of 10 blocks (numbered 0-9) is received, deduplication of the received blocks may be performed when a THN series of 5 or more of the received blocks match a THN sequence of 5 or more stored blocks (i.e., 5 or more blocks stored on the same track on a disk device). Thus if the THN series of received blocks 3-7 match a THN sequence of any 5 currently stored blocks, the THN series of received blocks 3-7 are considered redundant and is deduplicated on the disk devices.

As described above, the THN sequence method may deduplicate a series of THN or more received blocks, the threshold number being two or greater. As such, the THN sequence method may not deduplicate single received blocks or series of received blocks under the THN value. In some embodiments, the single received blocks and series of received blocks under the THN value having matching stored blocks may be deduplicated using the LLRRM deduplication methods described herein. In some embodiments, the THN sequence method is performed first to deduplicate THN series of received blocks using the disk devices, then the LLRRM processing/method is performed to process any received blocks not deduplicated by the THN sequence processing/method.

Figure 15:
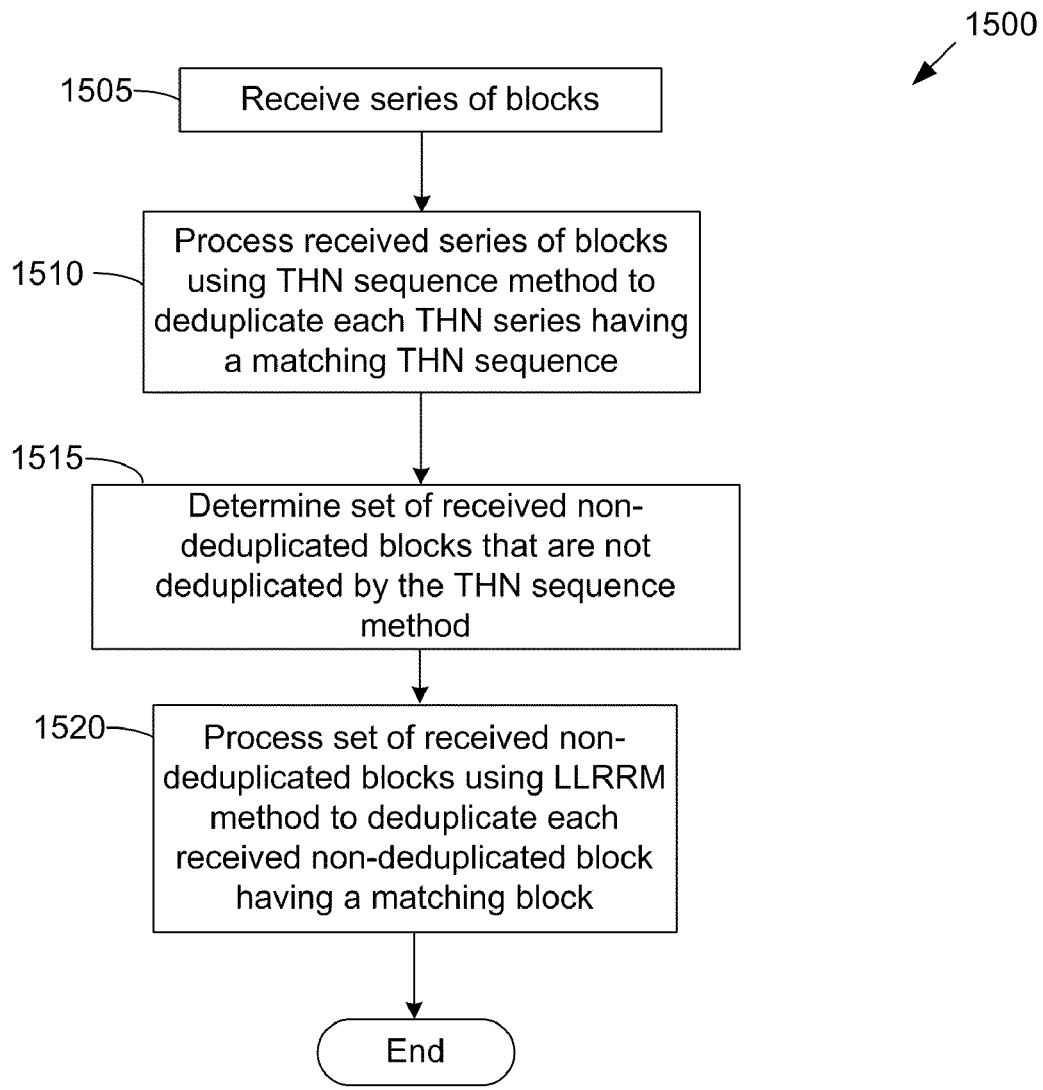
FIG. 15 is a flowchart of a method for deduplication of data using a THN sequence method in combination with an LLRRM method.

FIG. 15 is a flowchart of a method 1500 for deduplication of data using the THN sequence method in combination with the LLRRM method. In some embodiments, some of the steps of the method 1500 are implemented by software or hardware. In some embodiments, some of the steps of method 1500 are performed by the deduplication layer 275 of the storage operating system 300. The order and number of steps of the method 1500 are for illustrative purposes only and, in other embodiments, a different order and/or number of steps are used.

The method 1500 begins when the deduplication layer 275 receives (at 1505) a series of blocks for processing to determine whether any of the received blocks may be deduplicated. The method 1500 then processes (at 1510) the received series of blocks using the THN sequence method to deduplicate each THN series having a matching THN sequence. The THN sequence method is described in the U.S. patent application entitled "Deduplication of Data on Disk Devices Based on a Threshold Number of Sequential Blocks" (for example, in relation to FIGS. 14A-B and elsewhere throughout the application).

The THN sequence method may deduplicate a series of THN or more received blocks that match a sequence of THN or more stored blocks, the threshold number being two or greater. As such, the THN sequence method does not deduplicate single received blocks or series of received blocks under the THN value having matching stored blocks. The method 1500 then determines (at 1515) a set of received non-deduplicated blocks that were not deduplicated by the THN sequence processing/method and processes (at 1520) the set of received non-deduplicated blocks using the LLRRM processing/method. The LLRRM method may deduplicate each received block in the set having a matching stored block according to some embodiments herein. For example, the set of received non-deduplicated blocks may comprise the series of blocks received (at step 1305) and processed by the method 1300 of FIG. 13. The method 1500 then ends.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A method for deduplicating blocks of data, the method comprising:
    storing a plurality of blocks to a set of one or more disk devices;
    storing a plurality of blocks to a set of one or more low-latency random read memory (LLRRM) devices, an LLRRM device having lower latency in performing random read requests relative to a disk device;
    receiving a set of blocks;
    for each received block, determining whether the received block matches a block stored on a disk device; and
    upon determining that a matching stored block is found in a disk device, deduplicating the received block by:
        transferring the matching stored block from an original address location on a disk device to a new address location in an LLRRM device; and
        producing an index to the matching stored block, the index comprising the new address location of the matching stored block in the LLRRM device.

2. The method of claim 1, wherein a matching stored block is transferred to an LLRRM device upon the first instance of the stored block matching a received block.

3. The method of claim 1, wherein a received block matches a stored block when the blocks have the same data content or have a high probability of having the same content.

4. The method of claim 1, further comprising:
    providing a comparison mechanism for storing metadata entries for a plurality of stored blocks, each metadata entry comprising metadata for a stored block and being indexed in the comparison mechanism by a content identifier that represents the data contents of the stored block; and
    determining whether a received block matches a stored block by using the comparison mechanism.

5. The method of claim 4, wherein determining whether a received block matches a stored block comprises determining a content identifier for the received block and determining whether a matching content identifier is found in the comparison mechanism, wherein two blocks having the same content identifier have a high probability of having the same data content.

6. The method of claim 4, wherein a metadata entry for a stored block comprises a reference count indicating the number of indexes that reference the stored block and a set of pointers to the indexes, a pointer being used to modify an index to reflect the new address location when a stored block is transferred to an LLRRM device.

7. The method of claim 1, further comprising:
    providing a mapping mechanism for storing mappings of deduplicated received blocks to corresponding matching stored blocks; and
    producing indexes to matching stored blocks in the mapping mechanism, wherein:
        the mapping mechanism comprises a set of inodes or a metadata structure; and
        the mapping mechanism is used for performing a subsequent read request for deduplicated received blocks, wherein the read request comprises a read of one or more matching stored blocks on an LLRRM device.

8. The method of claim 7, wherein a received block comprises a block to be written to a disk device using a write log comprising the data of the block and an assigned address location for the block on the disk device, the method further comprising:
    deduplicating a received block by deleting the data of the block and the assigned address location for the block in the write log.

9. The method of claim 7, wherein the received blocks comprise blocks stored on a disk device, the method further comprising:
    deduplicating a received block by deleting the received block stored on the disk device.

10. The method of claim 1, further comprising:
    receiving an access request that specifies an address location and sending the received request to a disk device driver or an LLRRM driver depending on the value of the address location.

11. The method of claim 1, wherein an LLRRM device comprises a flash memory, Magnetic Random Access Memory (MRAM), or Phase Change RAM (PRAM) device.

12. A method for deduplicating blocks of data, the method comprising:
    storing a plurality of blocks to a set of one or more disk devices;
    storing a plurality of blocks to a set of one or more low-latency random read memory (LLRRM) devices, an LLRRM device having lower latency in performing random read requests relative to a disk device;
    receiving a set of blocks;
    for each received block, determining whether the received block matches a block stored on a disk device; and
    upon determining that a matching stored block is found in a disk device, deduplicating the received block by:
        determining whether a number of associated indexes referencing the matching stored block equals a predetermined threshold number, the threshold number being two or greater;
        upon determining that the threshold number of associated indexes reference the matching stored block, transferring the matching stored block from an original address location on a disk device to a new address location in an LLRRM device; and
        producing an index to the matching stored block, the index comprising the new address location of the matching stored block in the LLRRM device.

13. The method of claim 12, wherein the number of associated indexes indicate a number of received blocks that are deduplicated using the matching stored block.

14. The method of claim 12, wherein a received block matches a stored block when the blocks have the same data content or have a high probability of having the same content.

15. The method of claim 12, further comprising:
providing a comparison mechanism for storing metadata entries for a plurality of stored blocks, each metadata entry comprising metadata for a stored block and being indexed in the comparison mechanism by a content identifier that represents the data contents of the stored block; and
determining whether a received block matches a stored block using the comparison mechanism.

16. The method of claim 15, wherein determining whether a received block matches a stored block comprises determining a content identifier for the received block and determining whether a matching content identifier is found in the comparison mechanism, wherein two blocks having the same content identifier have a high probability of having the same data content.

17. The method of claim 15, wherein a metadata entry for a stored block comprises a reference count indicating the number of associated indexes that reference the stored block and a set of pointers to the associated indexes, a pointer being used to modify an associated index to reflect the new address location when a stored block is transferred to an LLRRM device.

18. The method of claim 12, wherein an LLRRM device comprises a flash memory, Magnetic Random Access Memory (MRAM), or Phase Change RAM (PRAM) device.

19. A method for deduplicating blocks of data based on a predetermined threshold number (THN) of sequential blocks, the method comprising:
storing a plurality of blocks to a set of one or more disk devices, each disk device comprising a set of tracks for storing blocks;
storing a plurality of blocks to a set of one or more low-latency random read memory (LLRRM) devices, an LLRRM device having lower latency in performing random read requests relative to a disk device;
receiving a set of blocks;
determining that a series of THN or more received blocks (THN series) matches a sequence of THN or more stored blocks (THN sequence), a series of blocks comprising a set of consecutive blocks and a sequence of blocks comprising a series of blocks stored on a same track of a disk device, THN having a value of 2 or greater;
deduplicating the blocks of the THN series using the matching THN sequence;
for at least one received block, determining that the received block matches a block stored on a disk device; and
deduplicating the received block by:
transferring the matching stored block from an original address location on a disk device to a new address location in an LLRRM device; and
producing an index to the matching stored block, the index comprising the new address location of the matching stored block in the LLRRM device.

20. The method of claim 19, wherein an LLRRM device comprises a flash memory, Magnetic Random Access Memory (MRAM), or Phase Change RAM (PRAM) device.

* * * * *